Oct. 22, 1929.　　S. EINSTEIN　　1,733,092
CENTERLESS GRINDING MACHINE
Filed Dec. 31, 1924　　13 Sheets-Sheet 2

Inventor
SOL EINSTEIN,
By Dodge and Sons,
Attorneys

Oct. 22, 1929.　　　S. EINSTEIN　　　1,733,092
CENTERLESS GRINDING MACHINE
Filed Dec. 31, 1924　　13 Sheets-Sheet 3

Inventor
SOL EINSTEIN,
By Dodge and Sons
Attorneys

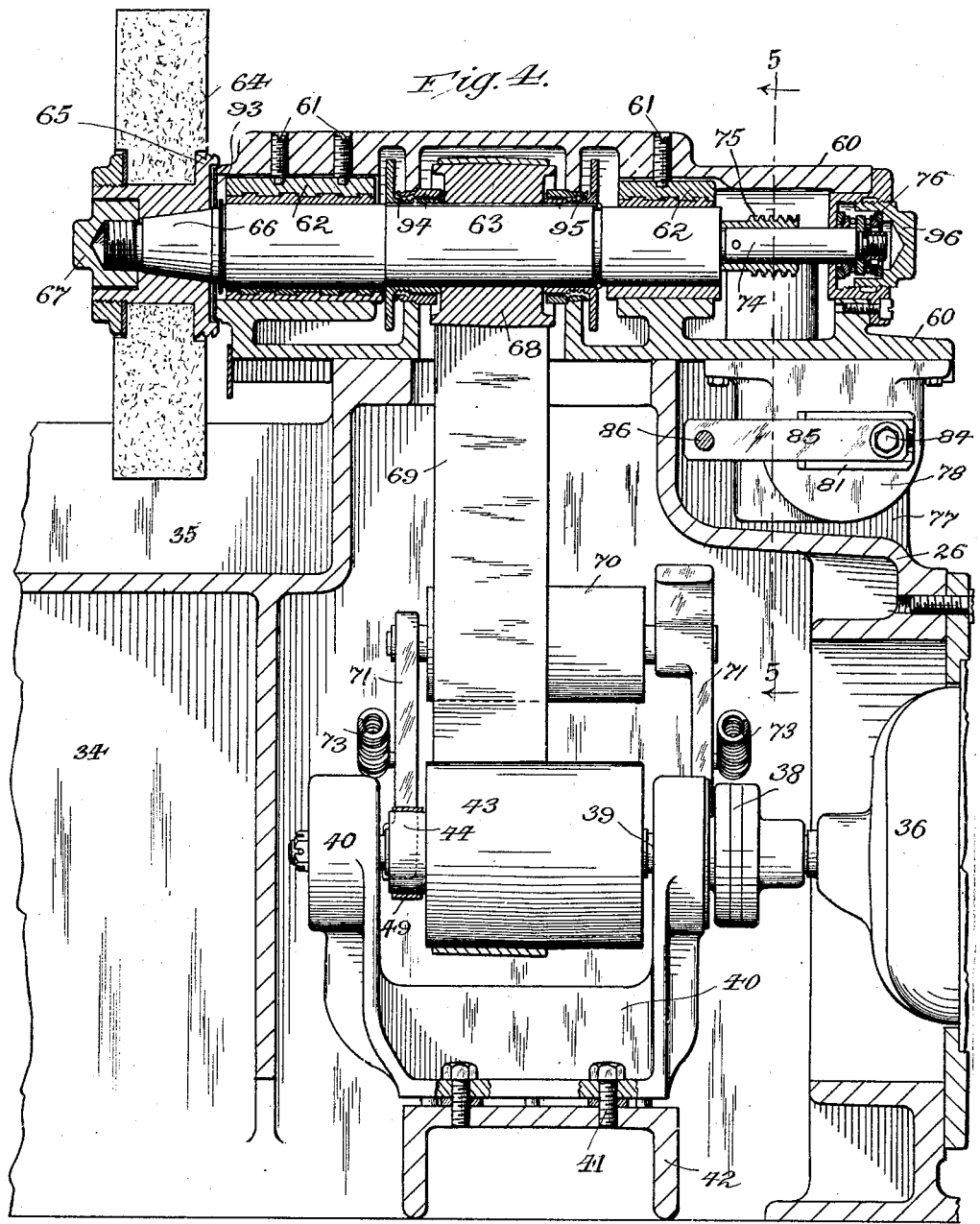

Oct. 22, 1929.   S. EINSTEIN   1,733,092
CENTERLESS GRINDING MACHINE
Filed Dec. 31, 1924   13 Sheets-Sheet 5
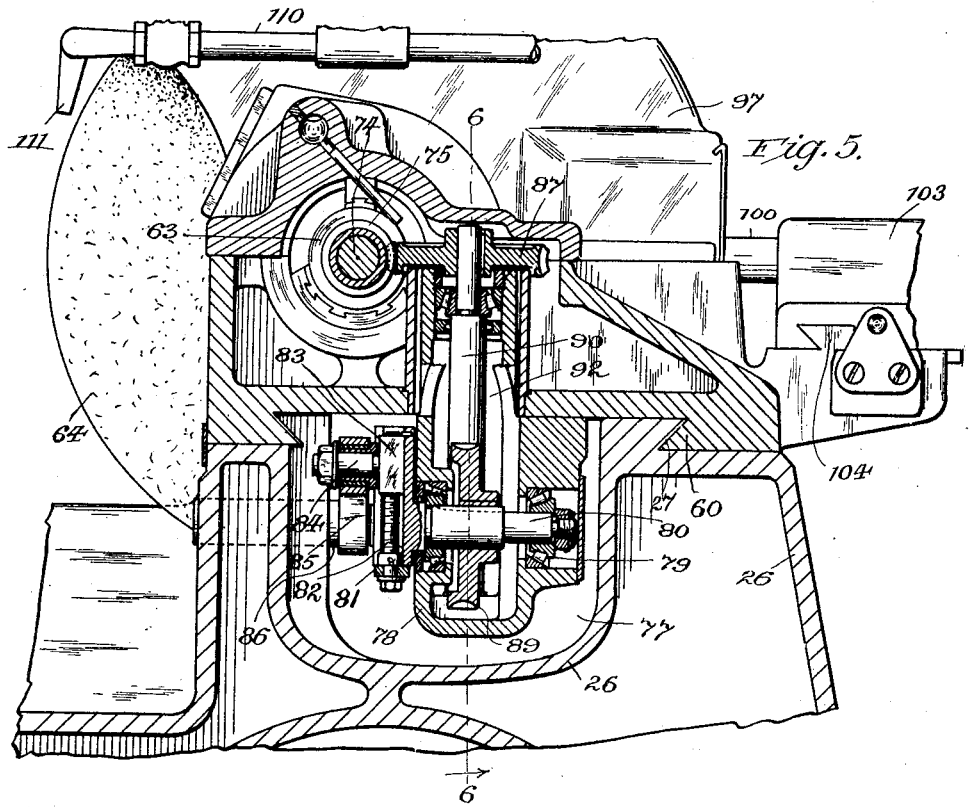
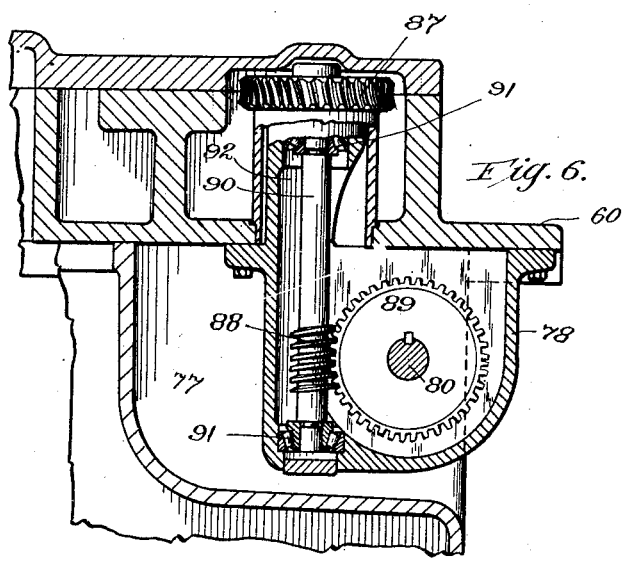
Inventor
Sol Einstein
By Dodge and Sons
Attorneys Oct. 22, 1929.                S. EINSTEIN                1,733,092
                      CENTERLESS GRINDING MACHINE
                  Filed Dec. 31, 1924      13 Sheets-Sheet 6
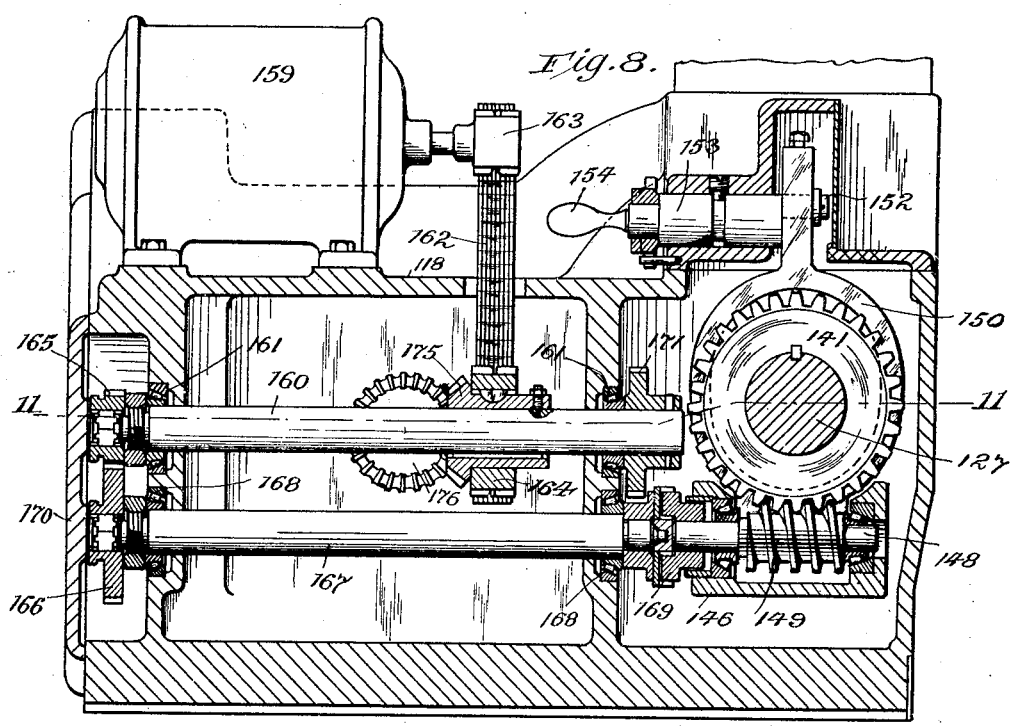
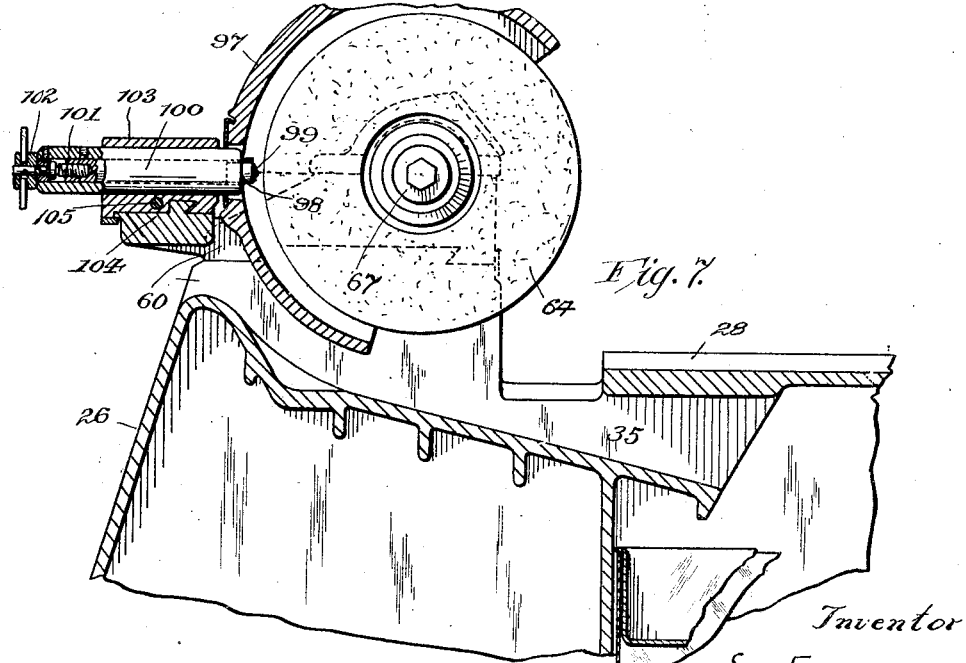
Inventor
SOL EINSTEIN,
By Dodge and Sons
Attorneys

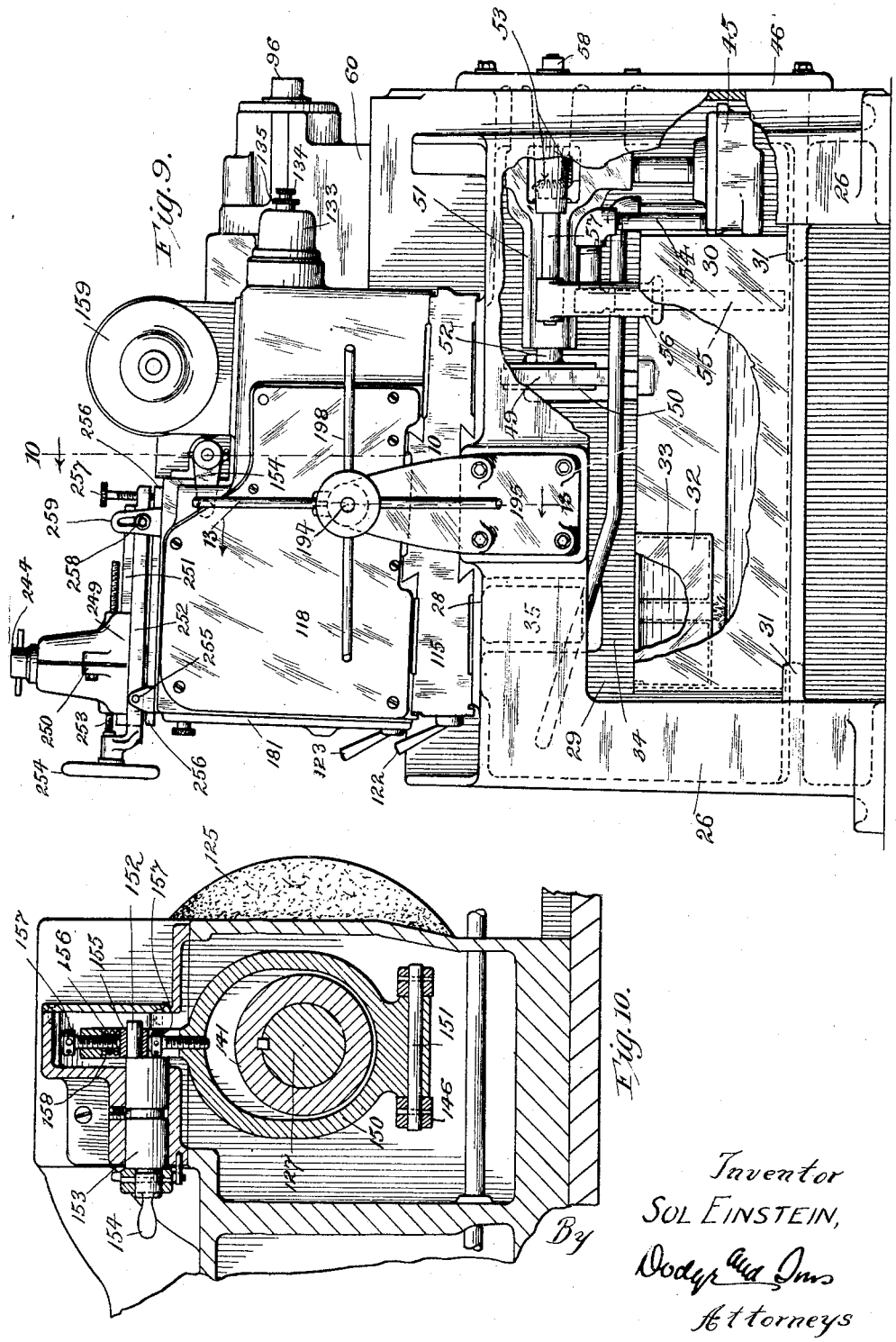

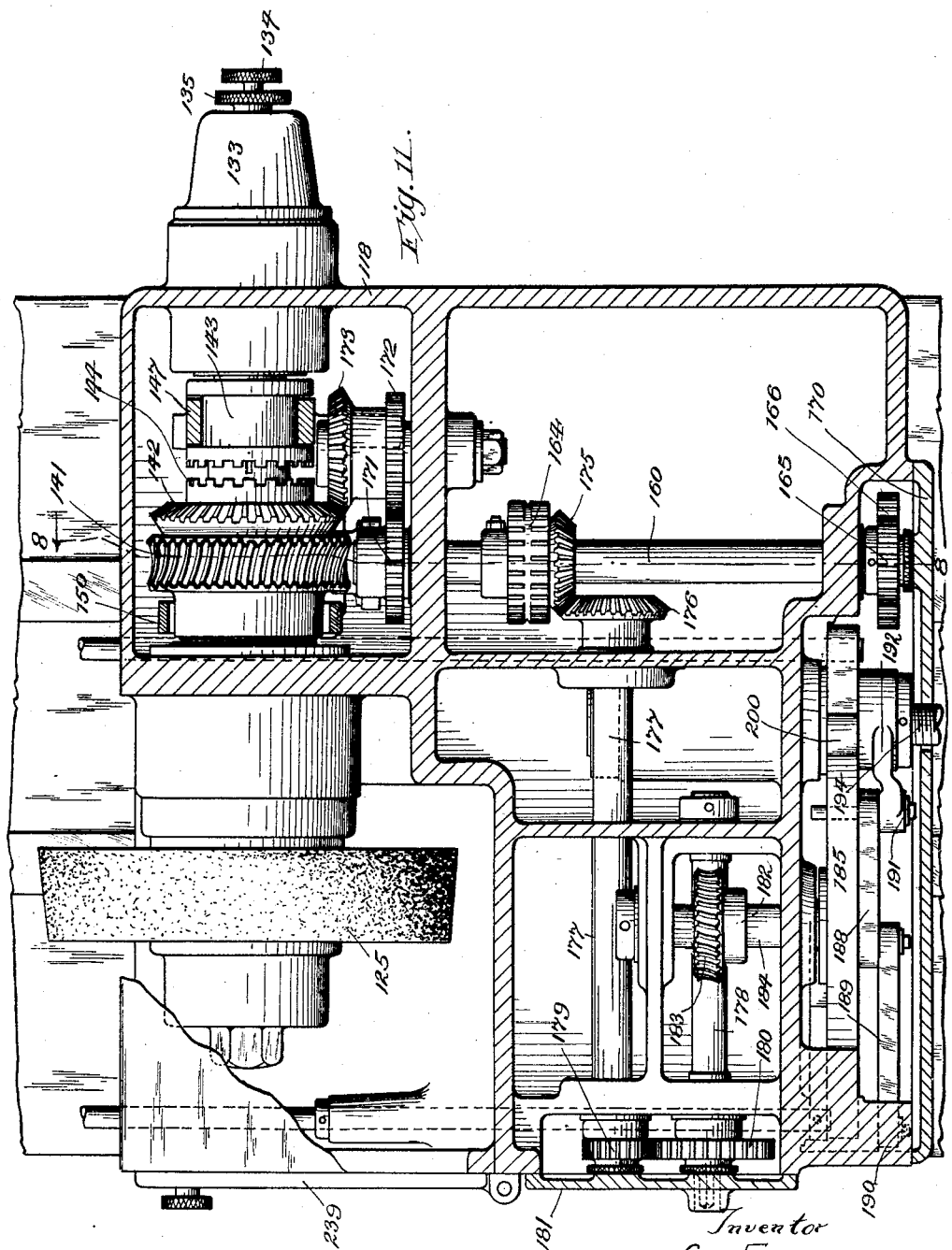

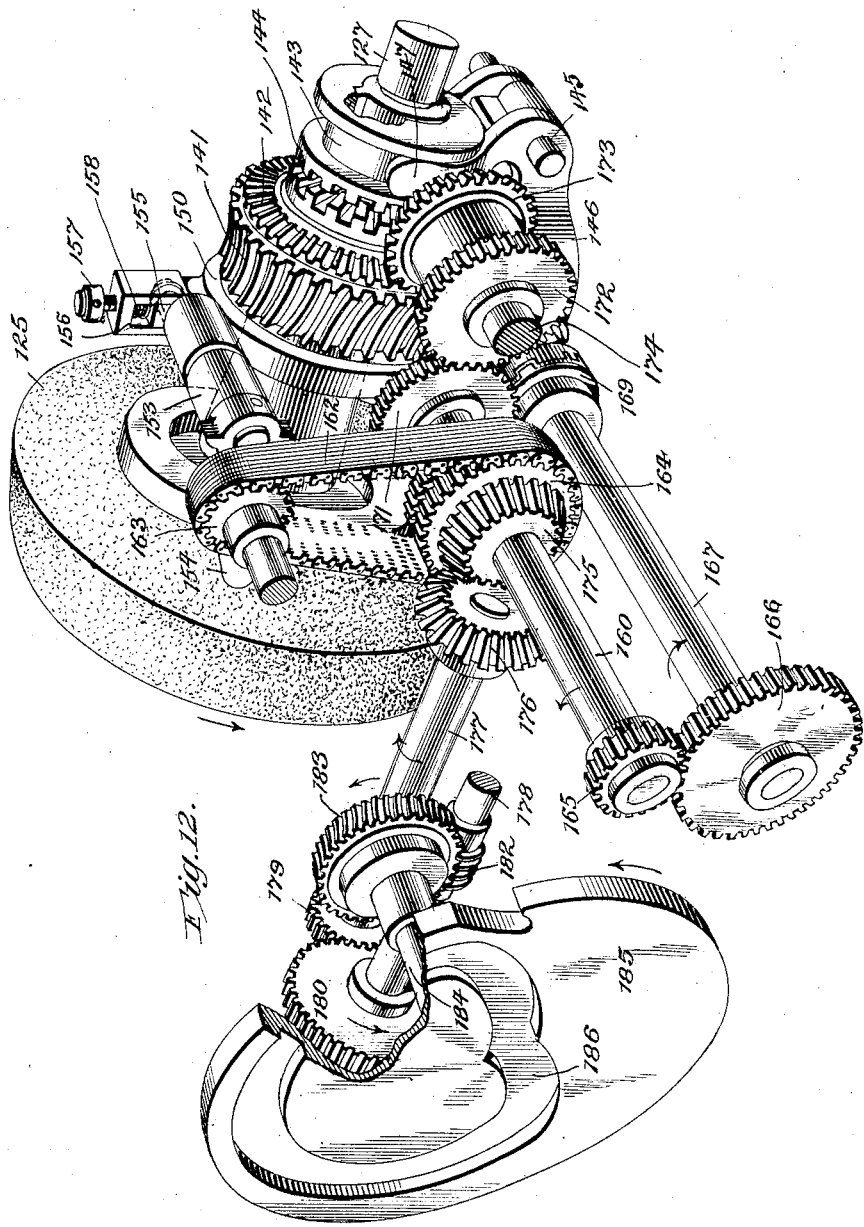

Oct. 22, 1929.　　　　S. EINSTEIN　　　　1,733,092
CENTERLESS GRINDING MACHINE
Filed Dec. 31, 1924　　　13 Sheets-Sheet 10
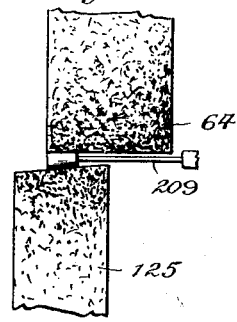
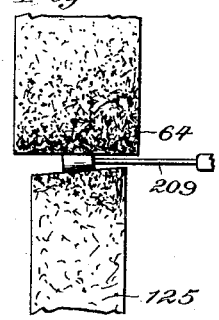
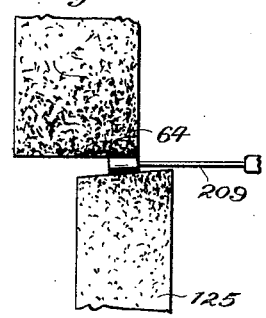
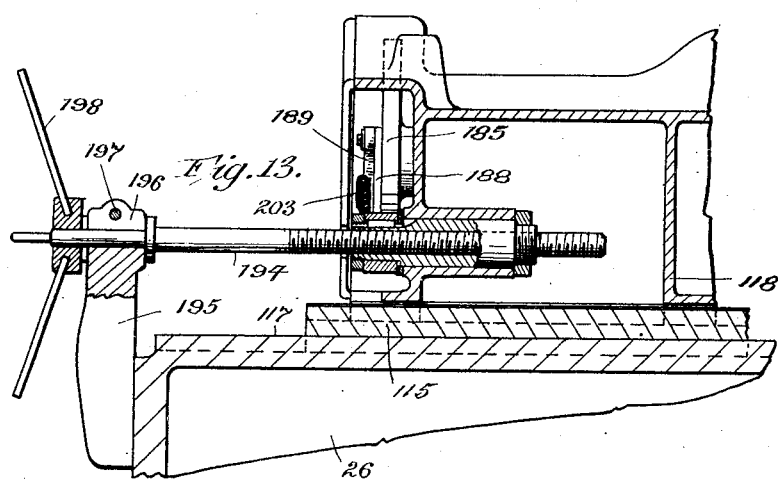
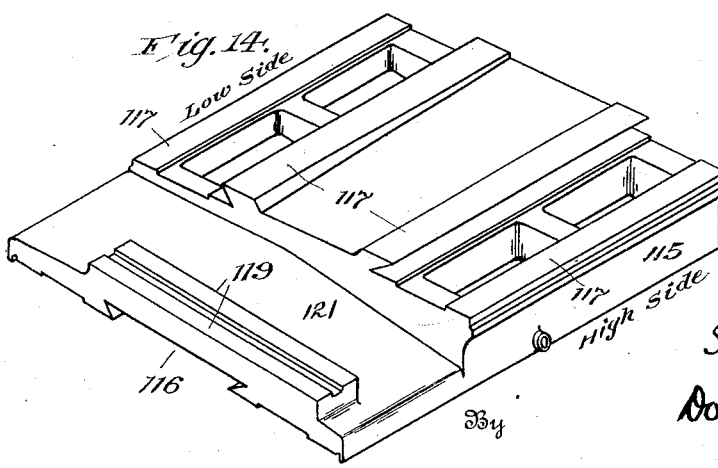
Inventor
SOL EINSTEIN,
By Dodge and Sons,
Attorneys

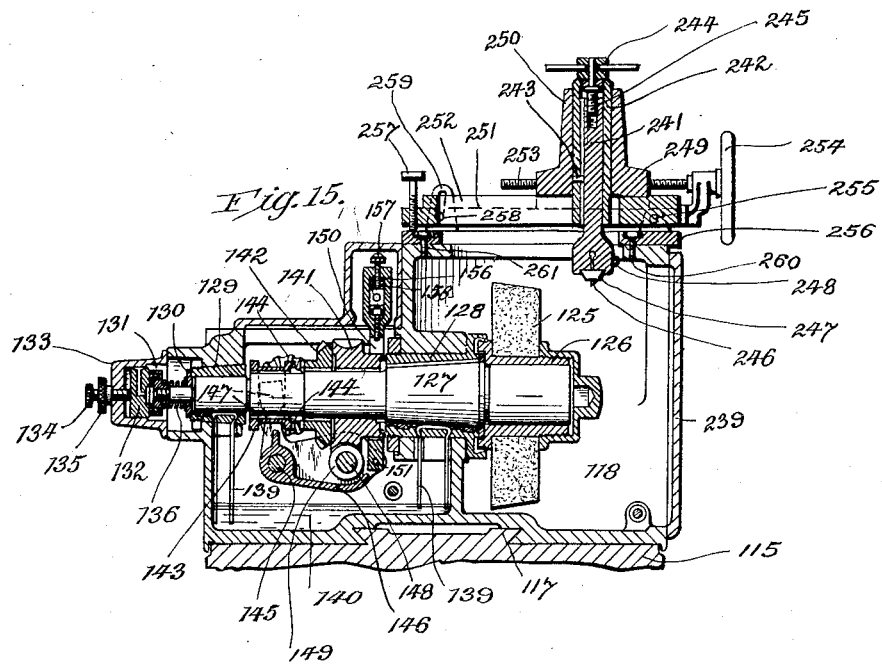

Oct. 22, 1929.　　　　S. EINSTEIN　　　　1,733,092
CENTERLESS GRINDING MACHINE
Filed Dec. 31, 1924　　　13 Sheets-Sheet 12
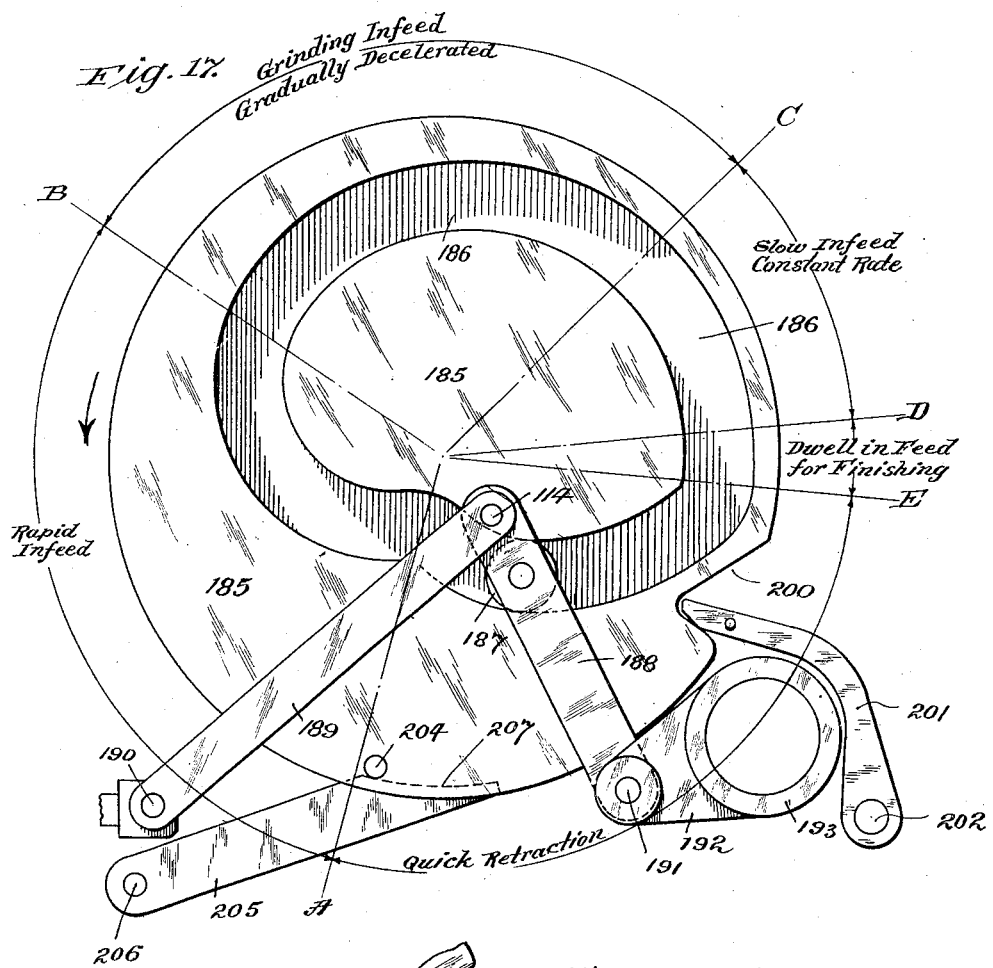

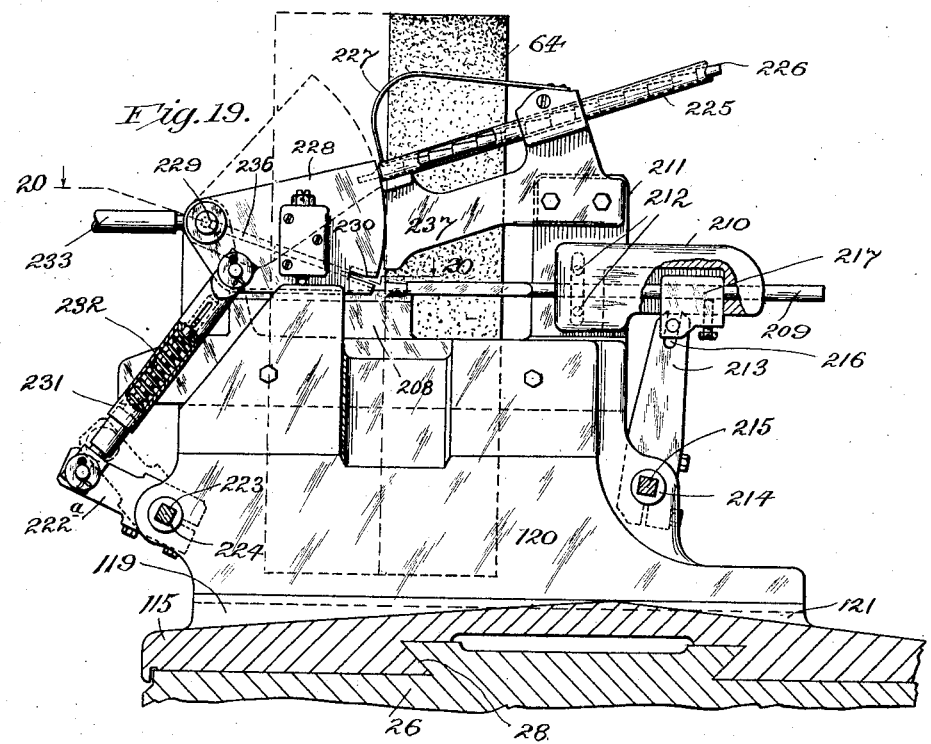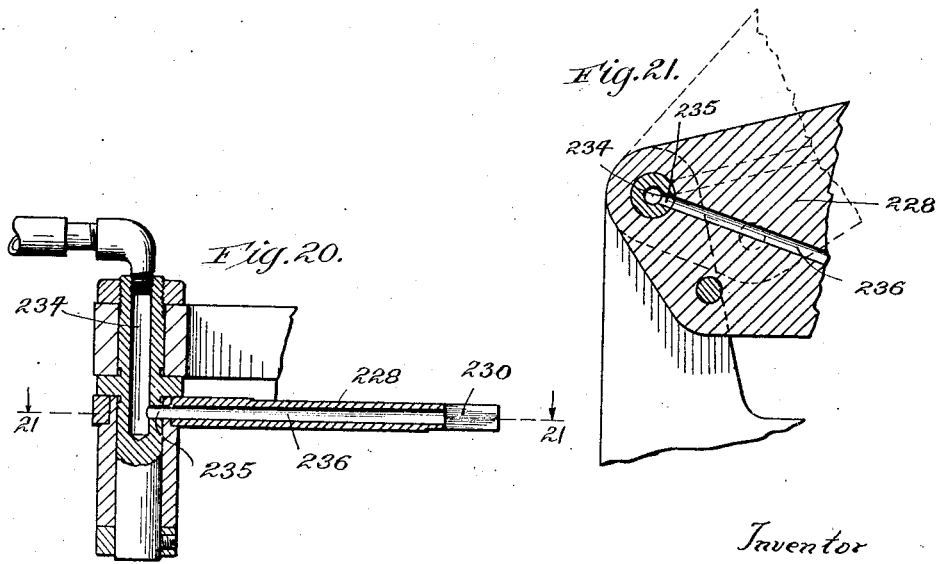

Patented Oct. 22, 1929

1,733,092

UNITED STATES PATENT OFFICE

SOL EINSTEIN, OF CINCINNATI, OHIO, ASSIGNOR, BY MESNE ASSIGNMENTS, TO CINCINNATI GRINDERS INCORPORATED, OF CINCINNATI, OHIO, A CORPORATION OF OHIO

CENTERLESS GRINDING MACHINE

Application filed December 31, 1924. Serial No. 759,119.

This invention relates to centerless grinding machines and particularly, but not exclusively, to centerless grinding machines of the type in which the grinding wheel and the regulating wheel are peripherally opposed.

Generally stated, a centerless grinder includes a work support designed to support a work piece to be ground to circular cross section between two opposed rotary elements, both of which preferably are composed of abrasive material. One of these, known as the grinding wheel, is driven at a high speed so that its function is chiefly that of grinding or abrading. The other of these, known as the regulating wheel, rotates at a much slower speed, so slow, in fact, that it performs no appreciable grinding function but merely serves to rotate the work piece or regulate the rotation of the work piece and, in certain cases, also to feed the work axially.

It is now established that most centerless grinding can best be performed with the work support so positioned that the center line of the work is above the line connecting the centers of the grinding and regulating wheels, and it is also recognized that for best effect the work support should be so formed and positioned that the work piece, under the action of gravity, tends to move into contact with the regulating wheel. The grinding wheel at its line of contact with the work piece moves in such a direction that it tends to urge the work piece against the work support, while the regulating wheel at its contact with the work piece moves in the opposite direction and regulates the rotation of the work piece.

The work piece may be automatically fed axially by so arranging the regulating wheel that at its line of engagement with the work piece it has a component of motion in the direction of the axis of the latter. In the peripherally opposed type of centerless grinder this feeding tendency is produced by slightly skewing the axis of the regulating wheel, so that its periphery moves in a direction oblique to the guiding surface of the work support.

There are two general classes of grinding which may be carried out on centerless grinders. The first is now known as through-feed grinding and is used chiefly with cylindrical pieces having no shoulders projecting beyond the surface being ground. In the through-feed method the work piece travels axially into contact with the grinding and regulating wheels, passes between the wheels, and is discharged at the opposite side of the wheels from that at which it entered. The other general class of grinding is now known as in-feed grinding. In one typical grinding process of this class the wheels are separated slightly for the insertion of the work piece. The work piece is inserted and the wheels are moved one toward the other to perform the grinding operation, such motion continuing until a predetermined interval between the wheels is reached. The wheels are then separated, and finally the work piece is removed. This type of grinding is available for use on straight cylindrical work, on many forms of taper work, and on either cylindrical or taper pieces ground to shoulders.

The present invention provides a machine which may be set up to do either type of grinding, as will be made apparent to those skilled in the art. Since many important features of novelty relate to the devices for grinding by the in-feed method, I have illustrated the machine as it appears when set up for in-feed grinding. For through-feed grinding it is merely necessary, as will be made clear hereinafter, to substitute the type of work support customarily used for this work, and to disconnect or render inactive the work ejector and regulating carriage feeds. Since such changes involve nothing not now familiar to those skilled in the art, specific illustration is unnecessary.

The present invention provides a machine which performs the feeding, grinding and ejection of the work pieces automatically, in the proper sequence and time relation. The timing of the various operations and the extent of movement of the parts are controlled preferably by a single element which may be quickly interchanged with other functionally similar elements designed to give different timing or different ranges of movement, as may be desired. This feature greatly facilitates setting up of the machine, and permits, at very small cost, the strict standardization of the performance of the machine for any particular operation.

Another feature of the invention relates to the regulating wheel mechanism. The regulating wheel, the driving train for the feed and ejection mechanisms, the truing fixture for the wheel, and a secondary quick acting change speed mechanism for use during the truing operation, are all mounted in a single carriage which is guided as a unit on the base of the machine. This construction of the regulating wheel mechanism as a single unit permits the freest adjustment of this unit without derangement of the drive and without effect on the grinding wheel and its drive. This is a matter of great practical importance, for the regulating wheel must be capable of adjustment toward and from the grinding wheel and furthermore must be capable of angular or skewing adjustment relatively thereto. A particular mode of securing this angular or skewing adjustment is described and claimed herein, but regardless of the mode of adjustment, the unitary carriage with motor and inbuilt power transmission will be found a feature of particular utility.

Certain features of the drive for the regulating wheel are not claimed herein but form the subject matter of a divisional application Serial No. 310,545, filed October 5, 1928.

Another feature of the invention relates to the angular or skewing adjustment of the regulating wheel as just suggested. This adjustment is effected by the interchange of special intermediate supports interposed between the regulating wheel unit and the main base of the machine. These supports are so designed as to give different desired degrees of angularity to the regulating wheel, and the construction results in the utmost rigidity and precision. Since the adjustment is one which it is not often necessary to make, this feature gives to the machine the necessary versatility without involving any risk of accidental derangement, and without loss of rigidity.

Another feature of the invention is the mounting of the grinding wheel upon a carriage bodily shiftable in the direction of the axis of the wheel through a considerable range; in the example illustrated, about four inches. It has heretofore been proposed to produce axial motion of the wheel during its grinding action by shifting the spindle in its bearings back and forth for approximately one-half inch. This construction is practicable for the purpose for which it is designed, but is not practicable where the motion must be large. Certain classes of work not heretofore successfully performed on centerless grinders require such motion in order to distribute the wear and thus preserve the accuracy of the grinding wheel. Accordingly, the use of the axially shifting carriage involves not only a change of mechanical construction, but also contributes an added function in the centerless grinding field.

For the purpose of shifting this carriage I make use preferably of a crank and connecting rod driven from the grinding wheel spindle. This mechanism produces a varying velocity rate of axial shifting (approximately simple harmonic motion), which is favorable to the even distribution of wear over the face of the grinding wheel.

Other details of the invention reside in the simplicity and ease of access of the change gear mechanisms, the simple and rigid construction of the base, the ease with which the tank and settling basin may be removed without disconnecting the pump, and in other details of construction and arrangement which, though too numerous to mention specifically, will be readily appreciated by those skilled in the art after a consideration of the following description of the preferred embodiment of the invention.

In the accompanying drawings:—

Fig. 4 is a fragmentary vertical section on the axis of the grinding wheel showing how the grinding wheel and the pump are driven, and illustrating the adjustable crank and connecting rod mechanism through which the grinding wheel carriage may be reciprocated, with any desired amplitude from zero to the maximum.

Fig. 5 is a fragmentary section on the line 5—5 of Fig. 4 looking in the direction of the arrow.

Fig. 6 is a fragmentary section on the line 6—6 of Fig. 5 looking in the direction of the arrow.

Fig. 7 is a fragmentary section on the line 7—7 of Fig. 3.

Fig. 8 is a sectional view on the line 8—8 of Fig. 11.

Fig. 9 is an elevation of the front end of the machine, certain portions of the base and of the tank structure being broken away.

Fig. 10 is a fragmentary section on the line 10—10 of Fig. 9.

Fig. 11 is a section of the regulating wheel carriage on the line 11—11 of Fig. 8.

Fig. 12 is a perspective view of the drive train mounted in the regulating wheel carriage.

Fig. 13 is a fragmentary section on the line 13—13 of Fig. 9.

Fig. 14 is a perspective view of one of the interchangeable supports used to determine the angularity of the regulating wheel.

Fig. 15 is a vertical section on the axis of the regulating wheel showing the change speed mechanism by which the regulating wheel may be driven at high speed during the use of the truing fixture.

Fig. 16 is a fragmentary view similar to a portion of Fig. 9, with the cover plate removed to show the feed and ejection controlling cam.

Fig. 17 is a face view of the feed and ejection controlling cam with a diagram and legends showing its various operative characteristics.

Fig. 18 is a perspective view showing the feed and ejection mechanism used in the in-feed method with straight cylindrical work.

Fig. 19 shows the feed and ejection mechanism intended for use with the in-feed method of operation where special pieces, such as tapered rolls, are to be handled.

Fig. 20 is a fragmentary section on the line 20—20 of Fig. 19 showing the discharger used in conjunction with the feed carrier.

Fig. 21 is a fragmentary section on the line 21—21 of Fig. 20.

Figure 1:
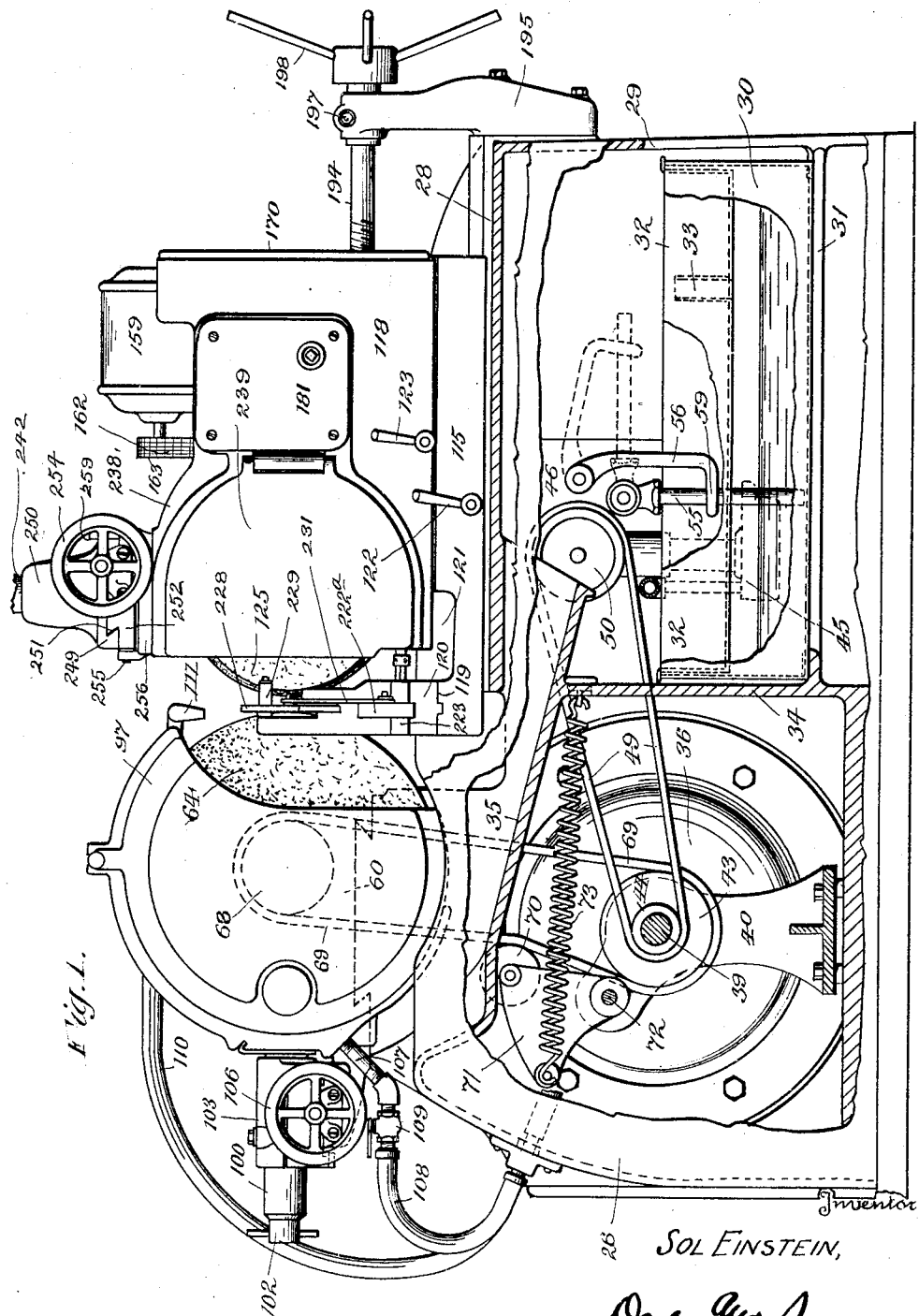
Fig. 1 is an elevation of the left or feed side of the machine, a portion of the base being broken away to show certain details of the grinding wheel and pump drives, and of the arrangement of the pump, the tank, and the settling basin.

Figs. 22, 23, and 24 are fragmentary views showing how the wear is distributed over the face of the grinding wheel by axial reciprocation thereof.

The base of the machine is indicated generally at 26 and is cast in one piece so as to give the utmost rigidity. On its top near the rear end the base is provided with a transverse guideway 27 on which is mounted the reciprocating grinding wheel carriage hereinafter described. On its top near the forward end it is provided with a longitudinal horizontal guideway 28 on which is guided the regulating wheel carriage hereinafter described (see Fig. 2).

The base is formed at its forward end (see Fig. 9) with an opening 29 through which the cooling-liquid tank 30 may be inserted and removed. This tank 30 rests on flanges 31 formed integrally with the base 26 and so spaced above the floor level that an ordinary industrial lift truck can be inserted beneath the tank and when elevated will serve to lift the tank from the flanges 31 so that it may be withdrawn from the base.

Suspended in the top of the tank 30 is a settling basin 32 which is provided below its upper margin and at a point relatively near the front end of the machine with an over-flow 33. The space which receives the tank 30 is separated from the remainder of the space within base 26 by a vertical partition 34, and extending over this partition 34 and beneath the grinding wheel is an inclined cooling liquid gutter or sluice 35 which discharges into the settling basin 32 near the rear end thereof; i. e., at a point remote from the over-flow 33. Thus the cooling liquid which is discharged upon the article being ground, flows by way of the sluice 35 to the settling basin 32, and thence by way of the over-flow 33 to the tank 30, from which it is again drawn by a pump and re-circulated.

Since a machine of this type will ordinarily remove as much as 70 cubic inches of metal per hour, and since in the same time the wear on the grinding wheel will be appreciable, it is obvious that the provision of the settling basin to remove particles of metal and abrasive material from the cooling liquid is an important matter. Even then the liquid in the tank should be changed at least as often as once a day. The tank is necessarily quite large and must be removed bodily from the machine for cleaning. The arrangement by which it may readily be withdrawn by means of an ordinary lift truck, available in almost any factory, is a feature of practical importance.

Mounted in an opening in the right side of the base 26 is a motor 36 which drives the grinding wheel and the pump. This motor is mounted as described and claimed in my prior application Ser. No. 696,196, filed March 1, 1924, that is to say, the motor is attached by a peripheral flange 37 which is bolted to the side of the base 26 in such a way that a portion of the motor and its shaft project through an opening provided therefor in the base into the space to the rear of the partition 34 (see Figs. 2 and 4).

The shaft of the motor 36 is connected by means of an Oldham coupling 38 with a shaft 39 which is mounted in bearings in a supporting yoke 40. This yoke 40 is adjustably mounted by means of the studs 41 and shims (see Fig. 4) on a cross member 42 cast integrally with the base 26. The shaft 39 carries fast upon it a cylindrical (i. e., uncrowned) pulley 43 from which the spindle of the grinding wheel is driven. The face of the pulley 43 is materially wider than the belt used therewith to permit the belt to creep and follow the slow axial reciprocating motion of the grinding wheel carriage hereinafter described.

Figure 2:
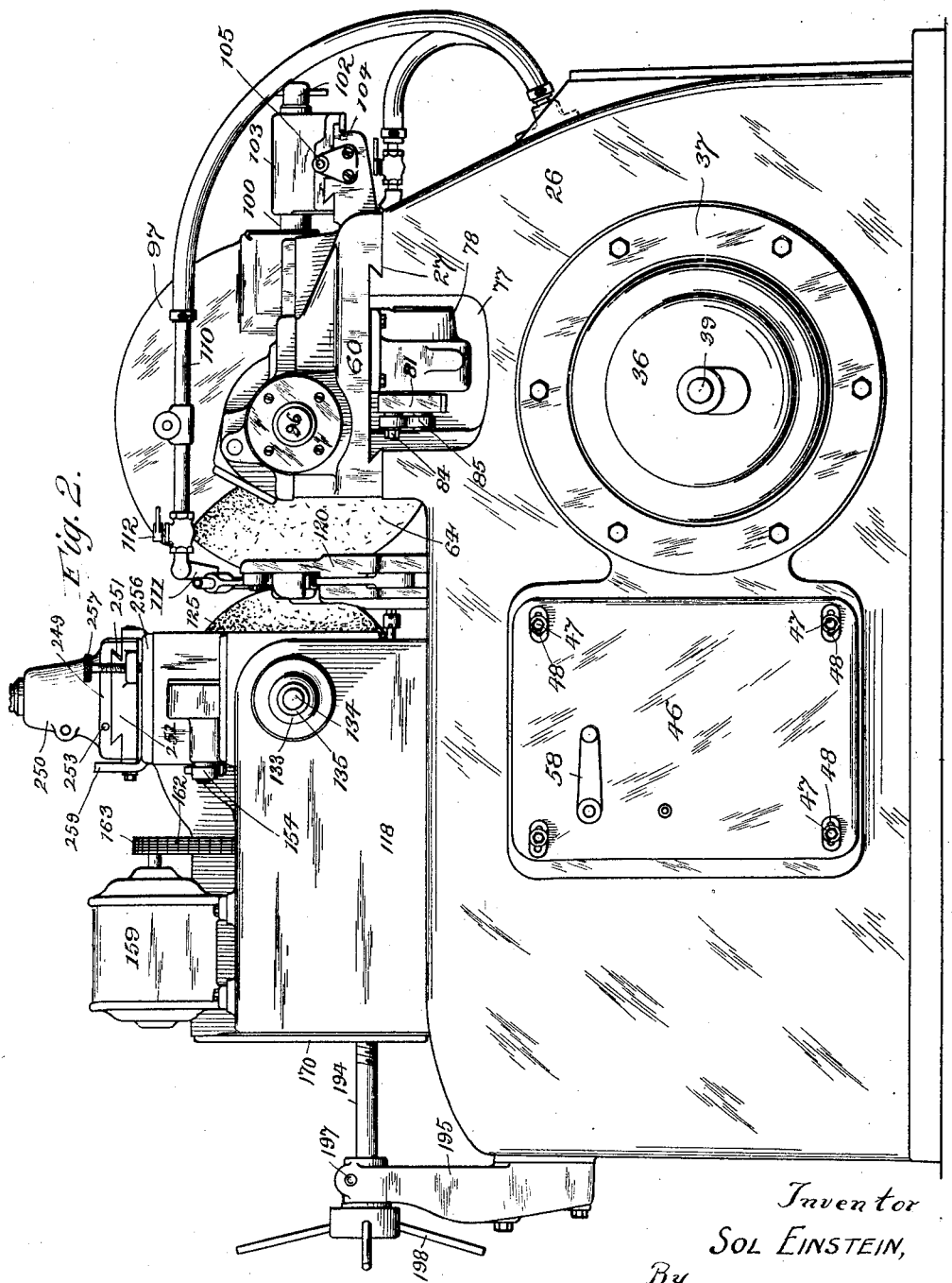
Fig. 2 is an elevation of the right side of the machine.
Figure 3:
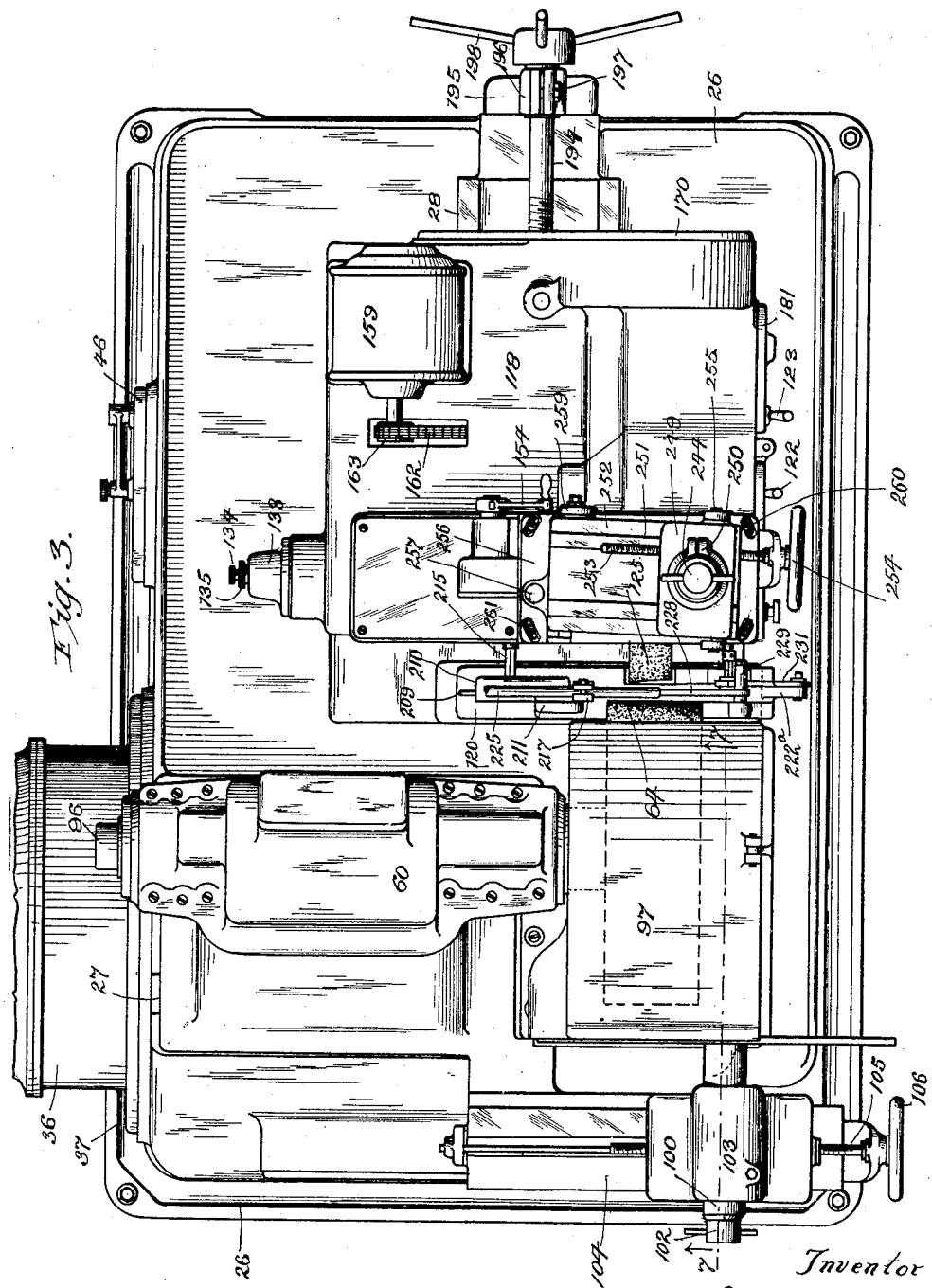
Fig. 3 is a plan view.

At one end of the pulley 43 and fast on the shaft 39 is a smaller pulley 44 which is used to drive the pump which circulates the cooling liquid. Referring particularly to Figs. 1, 2 and 9, it will be observed that the pump, indicated generally by the numeral 45 applied to its housing, is supported on a cover plate 46 which is bolted to the right side of the base 26 by means of bolts 47 passing through the horizontal slots 48. These slots permit the cover plate 46 to be adjusted in a horizontal direction so as to adjust the tension on belt 49 which runs on the pulley 44 and the driving pulley 50 of the pump 45.

As best shown in Fig. 9, the cover plate 46 is formed with a bracket extension 51 which carries the shaft 52 on which the pulley 50 is fast. A pair of bevel gears 53 shown in Fig. 9 transmit the motion of the shaft 52 to a vertical shaft which drives the runner of the pump in the housing 45. This pump is of the ordinary centrifugal type and it is deemed unnecessary to illustrate the runner and the vertical shaft upon which it is mounted in detail. The pump is mounted near to and outside the tank 30, preferably in a relatively low position so that it shall not require priming. The suction inlet of the pump is connected by pipe 54 with a swinging suction pipe 55 which is so arranged that it may swing down to a point near the bottom of the tank 30 or may be swung up to clear the top of the tank. The swinging suction pipe 55 is actuated by an arm 56 fast on a shaft 57 which is journaled in the cover plate 46, and which may be rotated by means of a crank 58 on the right hand side of the base (see Fig. 2). The swinging arm 56 engages the pipe 55 by means of a guide or eye 59 through which the pipe 55 may slide, thus compensating for non-alignment of their axes.

To remove the tank 30, the handle 58 is moved to raise the pipe 55 clear of the tank, and when this has been done, the tank is withdrawn on an ordinary lift truck. Another cleaned and filled tank may be immediately substituted. The tank-changing operation requires no material suspension of the operation of the machine.

The guides 27 are of the familiar dovetailed form with wide bearing surfaces. Mounted on these guides is the reciprocating carriage 60 which carries the grinding wheel. The carriage 60 is provided with babbitted bearings 62 for the shaft or arbor 63 on which is fixed the grinding wheel 64. These bearings are adjustable by means of screws 61. The wheel 64 is attached by means of the usual mount 65 which fits on a taper 66 on the end of arbor 63 and which is there retained by a cap nut 67 (see Fig. 4). It is desirable to use a large shaft and large bearings to ensure a high degree of rigidity.

Fixed on the shaft 63 between the bearings 62 is a crowned pulley 68 which is driven through belt 69 by pulley 43. The crown on pulley 68 causes this pulley to exert a centering tendency on belt 69, which creeps back and forth on pulley 43 as carriage 60 slowly reciprocates. The belt 69 is kept taut by a wide faced idler 70 which is mounted in a yoke 71 pivoted at 72 to yoke 40, and which is urged into contact with belt 69 by springs 73.

The shaft 63 has a reduced extension 74 at the end remote from wheel 64 and on this extension is mounted a worm 75. Beyond the worm 75 there is a self-aligning ball thrust bearing 76 which resists axial shifting of shaft 63 in carriage 60 under axial stresses, such as the thrust exerted by worm 75.

Mounted on the lower side of carriage 60 and working in a recess 77 formed in the base 26 is a housing 78 which encloses and supports the reduction drive for reciprocating the carriage 60. (See Figs. 4, 5 and 6.) Mounted in roller bearings 79 in this housing is a horizontal shaft 80 which carries a crank 81. Longitudinally adjustable in crank 81 by means of screw 82 is a block 83 which carries the crank pin 84. To the pin 84 is connected a pitman 85 whose other end is pivoted to base 26 in recess 77 at 86. The range of adjustment of block 83 is such that it may be set for any desired crank radius from the maximum setting illustrated in Fig. 5 to zero, which occurs when crank pin 84 and shaft 80 are axially aligned.

The crank shaft 80 is driven by a double reduction worm and wheel train consisting of a worm wheel 87 driven by a worm 75 and a second worm 88 meshing with worm wheel 89. The worm wheel 89 is fast on crank shaft 80 while worm wheel 87 and worm 88 are fixed on a vertical shaft 90 which turns in roller bearings 91 supported in housing 78. This housing, as is clearly shown in Figs. 5 and 6, has a shaft-supporting portion 92 extending upward into the interior of carriage 60.

As is clearly shown in Fig. 4, the shaft 63 is provided with oil and dust guards at 93, 94 and 95 and thrust bearing 76 is enclosed by a removable cap 96. It follows that the lubricant is retained and grit and water are excluded.

The carriage 60 carries a wheel guard 97 which encloses the major portion of the grinding wheel 64. The face portion of this toward the left side of the machine is removable. This guard is apertured at a point diametrically opposite the work support for the passage of the truing tool stock 98. This carries a diamond 99 (see Fig. 7) and is longitudinally adjustable through sleeve 100 by means of screw 101 and swiveled head 102. The sleeve 100 is clamped in carriage 103 which slides on guide 104 carried by carriage 60. The guide 104 is parallel with the axis of shaft 63 and the carriage 103 may be traversed thereon by means of the usual swiveled screw 105 and hand wheel 106.

A liquid connection 107 fed by pump 45 through a hose 108 and valve 109 serves to cool the diamond 99 during the truing operation (see Fig. 2). A second cooling liquid connection 110, also fed by the pump 45, discharges upon the work undergoing grinding through a nozzle 111 controlled by a valve 112.

Mounted on the guides 28 is an intermediate slide or carriage member 115 whose form is best shown in Fig. 14. This is the member which is interchanged to produce the desired angle of skew of the regulating wheel, the purpose being to determine the axial feeding action of the regulating wheel on the work. The guides 28 are horizontal and the desired skew is produced by making one side of the member 115 higher than the other. The high side and the low side are indicated by legends on Fig. 14, and the resulting angularity is even more clearly visible in Fig. 9.

Member 115 is provided with longitudinal ways 116 which coact with the guides 28 and is provided on its upper face with longitudinal guides 117 which support and guide the regulating wheel carriage 118. Across its rear edge the member 115 has a seat 119 on which is mounted the work support 120, hereinafter more fully described. Between the guides 117 and the base 119 is a sluice-way 121 which is designed to discharge the cooling liquid into the sluice 35, which discharges it into settling basin 32.

Mounted on the member 115 is a screw clamp 122 of ordinary construction (not shown in detail) which serves to clamp the member 115 on the guides or ways 28. The regulating wheel carriage 118 is provided with a similar clamp 123 which serves to clamp the carriage 118 on the guides or ways 117. A single shifting means acting upon the carriage 118 can thus be made to serve a double purpose. By setting the clamp 123 and releasing the clamp 122 a bodily movement of the carriage 118 will adjust the work support 120 toward and from the grinding wheel 64, its relation to the regulating wheel remaining unchanged. When this adjustment has been made, the clamp 122 is set and the clamp 123 is released to permit adjustment of the carriage 118 and the regulating wheel carried thereby relatively to the grinding wheel 64.

The carriage 118 is a hollow casting formed with the necessary webs to stiffen it and to support the bearings of the regulating wheel and of the drive train therefor. The regulating wheel 125 is carried on a mount 126 which is fixed on the end of the control wheel shaft or arbor 127. (See Fig. 15.) The arbor 127 is formed with suitable journals which are respectively mounted in a tapered main bearing 128 and in a second (cylindrical) bearing 129. Beyond the bearing 129 the shaft 127 is shouldered and carries, slidably splined thereon, a thrust collar 130 which bears against the outboard end of bearing 129. On the end of shaft 127 there is threaded a plain thrust disc 131 which turns against a thrust block 132 mounted in cap 133 which houses the end of shaft 127. The threads are so related to the direction of rotation of shaft 127 that disc 131 tends to screw onto the shaft when retarded by frictional engagement with block 132. The block 132 is held against rotation, but is adjustable in the direction of the axis of shaft 127 by means of thrust screw 134 and lock nut 135. A spring 136 surrounding the reduced portion of shaft 127 and held under compression between thrust disc 131 and thrust collar 130 tends to draw the tapered journal of shaft 127 into taper bearing 128 and this action is limited by the adjustment of thrust screw 134. In this way the shaft may be adjusted snugly in its bearings and yet may run without undue friction.

Bearings 128 and 129 are lubricated by capillary feeding wicks 139 which dip into a bath of oil 140 in the lower part of the carriage 118. Mounted on the shaft 127 between the bearings 128 and 129 are a worm wheel 141 of the close-fitting type keyed to the shaft 127, a bevel pinion 142 loose on the shaft, and a grooved clutch sleeve 143 axially shiftable on the shaft but splined thereto. The sleeve 143 and the hub of the pinion 142 are formed with complementary dental clutch members 144. The shifting of the clutch collar 143 toward and from the gear 142 serves alternately to clutch this gear to the shaft 127 and to release it therefrom.

Pivoted in the carriage 118 at 145 is a yoke 146 which is formed with an upstanding shipper fork 147 which engages the groove in the clutch collar 143 and serves to shift it into and out of clutching engagement with the hub. Journaled in the yoke 146 is a shaft 148 which carries a worm 149 in position to engage and drive the worm wheel 141 when the yoke 146 is drawn upward. The parts just described are so proportioned that the shifting of the yoke 146 about the axis 145 serves to carry the worm 149 into and out of engagement with its worm wheel 141, and at the same time disengage or engage the dental clutch which connects the gear 142 with the shaft 127. The worm drive is used in ordinary operations, the drive through the bevel gear being at much higher speed and being used only during the dressing or truing operation on the wheel 125.

The shifting of the yoke 146 is effected by means of a stirrup member 150 pivoted at 151 to the yoke 146 and connected at its upper end to a crank pin 152 on the end of a shaft 153 which is rotated through approximately 180° by means of a crank 154 (see Figs. 2, 3, 8, 9 and 10). The connection between the eccentric pin 152 and the stirrup 150 is not direct nor rigid, but is both yielding and adjustable. The pin 152 turns in a sliding block 155 guided in a slot 156 in the upper end of the stirrup 150. The range of movement of the block therein is adjustably limited by two capstan screws 157, and its upward thrust on the stirrup 150 is exerted through a coil spring 158 which surrounds one of the capstan screws and is confined above the sliding block 155 in the upper end of the slot 156. The effect is that the stirrup 150 exerts a yielding upward pull on the yoke 146 which draws the worm into close contact with its wheel and takes up all back lash and wear. This produces an irreversible drive of the regulating wheel and ensures absolutely smooth continuous rotation of the regulating wheel, a factor vital to successful work. In fact, the successful use of a worm drive for the regulating wheel is dependent on the use of a close fitting worm devoid of back lash.

The motor which drives the regulating wheel is shown at 159 and is mounted directly upon the regulating wheel carriage 118. This may be a constant speed motor in which change gears serve as the means for adjusting the speed of the regulating wheel, but the use of a variable speed motor offers still greater flexibility. The motor 159 drives the shaft 160, which is mounted in suitable bearings 161 in carriage 118, by means of a silent chain 162 running on the sprockets 163 and 164. The shaft 160 drives through change gears 165 and 166 a lower shaft 167 which turns in bearings 168 and which drives through an Oldham coupling 169 the shaft 148 upon which the worm 149 is mounted. The Oldham coupling 169 permits the shaft 148 to drop below the axis of the shaft 167 when the yoke 146 is lowered. When the worm 149 is meshed with its wheel 141, the shafts 167 and 148 are aligned, or substantially so. The change gears 165 and 166 may readily be slipped from the shafts 160 and 167 and other gears giving different ratios may be substituted. The gears are retained on the shaft by a cover plate 170 whose removal gives direct access to the change gears and also to the timing cam hereinafter described. (See Fig. 16.)

The pinion 171 (see Figs 8 and 11) fixed on the end of shaft 160 drives a pinion 172 which is constructed integrally with the bevel pinion 173, the two being journaled upon a stub shaft 174 and the bevel pinion meshing with the bevel pinion 142 to drive the same. Thus pinion 142 is constantly driven when the motor 159 is running, but when the worm 149 is engaged with its worm wheel 141, the clutch members 144 are disengaged and the bevel pinion 142 turns idly on the control wheel arbor 127. There is a neutral position in which neither is engaged.

A miter gear 175 fixed on the shaft 160 meshes with a companion miter gear 176 fixed on the shaft 177. As a matter of convenience, the sprocket 164 is keyed on the hub of the miter gear 175 (see Fig. 8), but this is a mere detail of construction and any equivalent arrangement might be adopted.

The shaft 177 drives a parallel shaft 178 by means of change gears 179 and 180 which are removable from the ends of the shafts to permit the substitution of other gears giving a different drive ratio. These gears are retained in position on their shafts by a cover plate 181 whose removal gives access to the gears (see Figs. 1 and 11). The shaft 178 carries a worm 182 which drives a worm wheel 183 fast on the shaft 184. Removably mounted on the end of the shaft 184 and accessible by the removal of the cover plate 170 is the timing cam 185. These cams may be removed and interchanged to give different characteristics of work supply, work discharge, and feed of the regulating wheel toward and withdrawal from the grinding wheel.

On its front face the cam member 185 has a continuous cam groove 186 in which runs a roller 187. This roller is journaled on a floating link 188, one end of which is pinned to and guided by a swinging link 189 whose other end is pivoted at 190 to the carriage 118. The floating link 188 is pinned to the link 189 at 114 and is pinned at its opposite end at 191 to arm 192 formed on a nut 193 which is swiveled in the carriage 118 and also threaded on the feed screw 194.

This feed screw 194 (see particularly Fig. 13) is supported at its outer end in a bracket 195 by means of a split bearing 196 which may be clamped by a screw 197 to lock the feed screw 194 against rotation. When not locked, it may be rotated by the hand wheel 198. During the operation of the machine the screw 194 is normally clamped against rotation and cam groove 186 serves to rotate the nut 193 on the screw 194 first in one direction and then in the other, thus feeding the carriage 118 and with it the regulating wheel 125 toward and from the grinding wheel.

It will, furthermore, be seen, in view of the foregoing, that I may also, during the operation of the machine, cause movement of the slide 115 and of the work-supporting structure 120 with the carriage 118 by setting the clamp 123 and releasing the clamp 122, as hereinabove described, thereby effecting, in response to the above-described actuation of the nut 193 under the control of cam groove 186, conjoint movement or feeding of both the carriage 118 (which carries the regulating wheel 125) and the carriage or slide 115 (which carries the work-supporting structure 120 and the work support 208—see Figure 18) toward or away from the grinding wheel. Under certain conditions of operation, it may be desirable thus to move the work support 208 and the regulating wheel 125 as a unit, under the control of the nut 193 and cam groove 186, toward or away from the grinding wheel.

The various characteristics of the cam slot 186 can best be described with reference to Fig. 17. The direction of rotation is indicated by the arrow. From the radial line marked "A" to the radial line marked "B", cam slot 186 moves the carriage 118 quite rapidly toward the grinding wheel. From the radial line marked "B" to the radial line marked "C", the regulating wheel is fed toward the grinding wheel at a rate which is progressively but slowly retarded. From the radial line marked "C" to the radial line marked "D", the inward travel of the regulating wheel is continued uniformly at the rate rate reached at the line marked "C". From the radial line marked "D" to the radial line marked "E", carriage 118 is held at rest to permit the grinding wheel to perform a finishing operation. From the radial line marked "E" to the radial line marked "A", there is a quick reverse movement of the carriage 118 to its initial position.

The cam disc 185 has formed on its periphery a notch 200 which, shortly before the termination of the reverse movement just mentioned, allows the arm 201, fixed on the shaft 202, to make a sharp inward movement under the influence of the coil spring 203 (see Fig. 16). The shaft 202 actuates the work ejector by this sudden movement, as is hereafter described.

Mounted on the back of the cam disc 185 is a pin 204 which operates to wipe down a lever 205 fixed on the shaft 206. The shaft 206 serves to actuate the means for feeding in the work. When the pin engages the member 205, it first moves it downward and then swings across an arcuate surface 207 which, in the retracted position of the arm 205, is concentric with the axis of the cam disc 185. Accordingly during this period the arm 205 remains at rest and just at the beginning of this period of rest the arm 201 drops into the groove 200. Upon the conclusion of the quick reverse movement of the carriage 118, the arm 205 is freed by the pin 204 and moves upward.

It will be observed that the cam disc 185 not only controls the feed of the carriage 118, but also controls and actuates the two shafts which bring about the supply of the work piece to the work support and the ejection of the finished piece. The feeding and ejection mechanisms may be variously embodied and two specifically different forms of feed mechanism are shown in Figs. 18 and 19 respectively. Generally stated, the motion of the arm 205 carries the feeding carrier away from the work support to permit the ejection of the finished piece, and after this ejection returns it to its normal position to place upon the work support a new work blank which in one form of feed mechanism has been supplied to it in its withdrawn position. In both cases the ejector mechanism is fundamentally the same.

In both the structures of Fig. 18 and Fig. 19 the work support 120 carries a bevel work supporting member or strip 208, the bevel on the upper edge of the strip 208 being such as to throw the work piece toward the regulating wheel. On the right side of the machine and projecting over the strip 208 in position to engage the work piece is the ejector plunger 209 which is longitudinally slidable in a guide block 210. The guide block 210 is vertically adjustable on a bracket 211 by means of clamping screws 212 which pass through slots in the bracket 211. The ejector plunger 209 is actuated by an arm 213 fast on the shaft 214 which has a squared end 215 in telescoping engagement with the rear end of the ejector shaft 202 described with reference to Figs. 16 and 17. The arm 213 has a pin and slot connection 216 with a block 217. In the normal position of the parts, the rod 209 serves as a stop to arrest the work piece, the direction of the feed by the regulating wheel 125 being such as to urge the work piece against the rod 209 and retain it in contact therewith despite axial reciprocation of the grinding wheel. When the arm 201 drops into the notch 200, the regulating wheel will be in its retracted position, so that the piece is freed by the wheels, and is struck off the work supporting strip 208 by the sudden inward movement of the rod 209. At this time the feed mechanism will be moved by the pin 204 to a position clear of the work supporting strip 208, thus permitting ejection to occur.

Two types of feed mechanism are shown. The simpler form shown in Fig. 18 may be used with ordinary cylindrical pieces. It consists of a feed trough 219 pivoted at 220 on a bracket 221 and urged upward by an arm 222 fast on the shaft 223 having a squared end 224 in telescoping engagement with the rear end of the feed shaft 206. When the arm 205 is wiped down by the pin 204 (see Fig. 17) the sequence of operation is as follows. When the regulating wheel approaches its most retracted position, the trough 219 is elevated and as soon as its inclination is reduced, the gravity flow of work pieces ceases. While the trough 219 remains elevated the ejector plunger 209 knocks out the finished work piece, after which the trough 219 is lowered and feeds by gravity a single piece to the support 208. At this time the ejector plunger is in its retracted position and serves as a stop to position the piece fed by the trough 219 and preclude the feed of more than one blank.

This relatively simple feed is not practicable for use with any but relatively simple pieces, and Figs. 19, 20 and 21 illustrate a preferred form of feed mechanism adapted especially to be capable of feeding special pieces, such as tapered or conical rolls.

Referring now to these figures, 225 is a tube which is fed from any suitable magazine with blanks. In the case of the conical blanks 226, illustrated in Fig. 19, any of the known feed mechanisms capable of feeding the blanks 226 to the tube 225 with their large ends forward may be adopted. 227 is a resilient stop finger which arrests the lowermost blank in a position to be seized. This stop finger 227 is pressed back to release the lowermost blank by a swinging carrier 228 when the latter swings to its uppermost position about its axis 229. Under these conditions the lowermost blank slides into a notch 230 formed in the margin of the carrier 228. On the descent of the carrier 228, the finger 227 returns and arrests the succeeding blank. The carrier 228 is actuated by an arm $222^a$ on the shaft 223 similar in its general function to the arm 222 already described. The arm $222^a$ is connected by means of a yielding link 231 to the carrier 228 in such manner as to shift the latter between its lower and upper positions when the arm 205 is forced down and then released by the pin 204.

The yielding link 231 is composed of two telescoping members held in normal extended position by compression coil spring 232, the purpose of using the yielding link being to prevent injury to the feed mechanism if one of the blanks should become jammed.

The range of motion of the carrier 228 is such that in its lower position the blank-receiving notch 230 is immediately above the work-supporting blade 208. In order to eject the work piece from the notch 230, I make use of a water pressure ejector fed by water through the connection 233 from the pump 47.

The pivot on which the carrier 228 turns (see Figs. 20 and 21) is provided with an axial port 234 and a radial port 235 which, in the lower position of the carrier 228, registers with a port 236 in the carrier 228. The port 236 extends to and discharges at the head of the carrier notch 230. It follows from the construction that when the carrier is in the upper position, the flow of water is automatically shut off, while at and near the lower position the flow of water is restored and serves to eject the work blank from the notch 230. The work blank is thus made to slide out of the notch 230 and it drops upon the work support 208, the inclined surface of which causes the blank to roll against the regulating wheel, the latter acting to rotate the blank and feed it along the work support 208, into operative relation to the grinding wheel, and ultimately against the combined ejector and stop 209, all as is more clearly described hereinafter. Premature ejection of the blank is precluded by a guard or shroud 237.

The regulating wheel 125 is provided with a guard 238. This has a hinged side cover 239 which may be opened to give access to the wheel 125 for removal thereof.

The truing mechanism for the regulating wheel is provided with three adjustments coordinated in a special way. The machine is designed as above described to grind tapers and to grind them with the regulating wheel slightly skewed so that it holds the work piece against the combined ejector and stop 209, regardless of the axial movement of the grinding wheel. For absolute precision the truing fixture must act on the wheel on a line which corresponds geometrically with the line of contact of the work piece with the regulating wheel. Therefore it must be capable of angular adjustment to correspond with the amount that the regulating wheel is skewed; it must be capable of another and independent angular adjustment to correspond with the taper imparted to the regulating wheel to enable this to grip a tapered piece and hold it in proper relation to the grinding wheel; it must be capable of a lateral adjustment or offset to compensate for the displacement of the line of engagement between wheel and work from a line connecting the wheel centers.

When these three adjustments are properly made, and in my embodiment each is independent of the others, the diamond cutting tool carried by the truing fixture traces a path which corresponds geometrically with the line of contact of the work piece with the regulating wheel. As will be apparent upon reflection, the truing fixture turns the regulating wheel to approximately a hyperbolic conoid where the work piece is to be a conical surface.

Referring now to Figs. 1, 2, 3, 9 and 15, the truing tool stock 241 is mounted in a sleeve 242 and is held against rotation therein by a pin or key 243 which engages a longitudinal slot in the stock 241, as best shown in Fig. 15. The stock 241 is longitudinally adjustable in the sleeve 242 by turning a head 244 which is swiveled in the sleeve 242 and which has threaded engagement with the stock 241 at 245. A cutting diamond 246 is clamped in a dovetailed block 247 adjustable in a direction transverse to the stock. The block 247 may be clamped in its adjusted positions by means of the clamp screw 248. The transverse adjustment of the sliding member 247 compensates for the offset of the line of contact of the work piece with the regulating wheel, measured from the line connecting the centers of the grinding and regulating wheels. The swiveled head 244 adjusts the depth of cut.

The sleeve 242 is clamped in a carriage 249 by means of the split sleeve and nut 250. The carriage 249 slides on ways 251 formed on a taper-adjusting bed 252 and may be traversed on said ways by means of a swiveled screw 253 which is rotated by means of a hand wheel 254. The taper-adjusting bed 251 is pivoted at 255 to a skew-adjusting bed 256 so as to swing about a horizontal axis. It is adjusted about this axis by a thumb screw 257 and may be clamped in adjusted positions by means of the clamp screws 258 engaging the upstanding slotted ears 259.

The skew-adjusting base 256 is set to agree with the angle of skew imparted by the interchangeable member 115 and hence this adjustment need seldom be made. It is effected by means of the screws 260, 261, shown in Fig. 15. These screws pass through arcuate slots formed in the skew-adjusting base 256. The skew adjustment is shown in the plan view Fig. 3, and is not changed except when bases 115 are interchanged, as will be well understood.

The machine as above described when provided with the work feeding mechanism illustrated in Fig. 19 is particularly intended for grinding tapered rolls such as are used in certain well-known roller bearings. It is capable of being set up for other classes of work, as will be explained hereinafter, but in order that the operation of the machine and the reason for certain of its special characteristics may be fully understood, I shall first describe it as used in the special field of grinding tapered rolls.

For commercial reasons the blanks for these rolls are prepared by a forging process. That is to say, the conical blank is formed by swedging an approximately cylindrical blank in a tapered or conical die to a generally conical form of slightly greater diameter than the desired finished roll. The result of this method of manufacture is a tapered blank which may not be of strictly homogeneous character. Furthermore, the middle portion of the die is subjected to greater wear than other parts, and after the die has been used for a considerable period and before it is worn out, it produces a conical roll blank of conoidal, rather than of truly conical, form. That is to say, the element of the conical blank instead of being strictly straight, is slightly convex or curved.

The tendency of conoidal blanks of this description is to wear the grinding wheel more rapidly where the central portion of the tapered roll bearing engages the grinding wheel, for here more metal is removed. It is to overcome this effect that the grinding wheel is shifted axially through a range approximating its width of face. This motion of the grinding wheel naturally tends to shift the work piece on the work support, and it is to resist the tendency to move the work piece away from the combined stop and ejector 209 that the regulating wheel is skewed slightly to impart to the work piece a force component in the direction of the stop 209.

The use of a crank and connecting rod to shift the grinding wheel is advantageous because the motion of the grinding wheel is progressively slowed toward each limit of travel, the motion being approximately harmonic. Theoretically it would be desirable to make it strictly harmonic, but this would involve additional complication not justified by the improved result, and hence a crank and connecting rod are preferred. The point of contact with the work piece moves back and forth across the face of the grinding wheel. The middle portions of the face are traversed twice, first in one direction and then in the other, while each limit of movement is reached but once in a complete cycle. Thus the slow motion near the limits tends to equalize the wear.

In grinding tapered rolls it is desirable that the grinding wheel be of true cylindrical form because in this way the greatest uniformity of grinding effect throughout the length of the roll is had. This conduces to uniform finish and furthermore permits the use of a truing fixture of the very simplest form for the grinding wheel.

The grinding wheel is driven by the motor 36 at appropriate speed, and this speed may be adjusted to suit conditions, since the motor 36 is preferably of the variable speed type. The rate of axial movement of the grinding wheel has a fixed relation to the rotary speed of the wheel and need not be subject to adjustment, though the amplitude of movement is adjustable. The speed of the regulating wheel is controlled, first by the speed of the variable speed motor 159, and second, by means of the change gears 165, 166 (see Fig. 8). The rate at which the cam 185 turns is affected, first by the speed of the motor 159, and second, by the change gears 179 and 180. In ordinary practice change of the speed of the motor 159 is the adjustment most commonly used, the change gears 165 and 166 in conjunction with the change gears 179 and 180 being relied upon primarily to produce the desired relation between the rotative speed of the regulating wheel 125 and the rotative speed of the control cam 185. The cam 185 is interchangeable to produce any desired timing of the feed and ejection mechanism, and also to control the carriage movement both as to range of movement and as to the variable speed characteristics of such movement.

From the above it will be seen that the machine is fully automatic and that the speed of the grinding wheel, the amplitude of its axial motion, and the speed of the regulating wheel are all subject to ready adjustment. With these various characteristics properly co-ordinated according to the size and form of the piece and the material of which it is made, it is further possible to set the timing of feed, the timing of ejection and the timing, amplitude and speed of the in-feed motion of the regulating wheel to give any desired result within the capacity of the machine. The manner of making these adjustments is described above in detail and need not be repeated.

Assuming that the various speeds, amplitude and timing are properly arranged for the work to be undertaken, and that the wheels are properly dressed to the forms necessary to impart to the finished piece the intended configuration, the operation of the machine is as follows. The conical work blank 226 slides down the feed tube 225, and when the carrier 228 swings to its uppermost position, it wipes back the detent 227 and permits the blank 226, pressed forward by succeeding blanks, to enter the notch 230 in the carrier 228. When the carrier 228 swings downward, the detent 227 arrests the succeeding blank, while that blank which has entered the notch 230 is carried to a position directly above the work supporting strip 208. At this time it is ejected from the slot 230 by the water jet flowing through the port 236. As it slides out and drops upon the work supporting strip 208, it enters between the grinding wheel 64 and the regulating wheel 125, and rolling against the regulating wheel 125 because of the inclined top surface of the work supporting strip 208, is lightly engaged by the regulating wheel, rotated, and fed thereby into engagement with the end of the stop and ejecting member 209. The inclined top surface of the work-supporting member 208 is thus effective, as the blank drops upon the work support 208, to make the blank roll against the regulating wheel 125 and the latter, related as above described to the work support 208 to cause axial feeding movement of the blank in a direction toward the right, as viewed in Figure 19, thus moves the blank axially toward the narrower end of the grinding throat formed by the two wheels (see Figures 22, 23 and 24) and into position to be engaged by the grinding wheel, as the regulating wheel continues to rotate the work, and finally, into engagement with the end of member 209.

At or about this time the regulating wheel carriage 118 starts its rapid movement toward the grinding wheel 64, so that shortly after the blank arrives in position it is engaged by the grinding wheel 64 and the grinding operation commences. This grinding continues as the two wheels move toward each other, the motion of the regulating wheel carriage 118 being first relatively rapid and then gradually retarded. Finally the motions ceases altogether, and for a short period the work piece is ground with the carriage at rest. This gives the final finish to the work piece. At the end of this period the regulating wheel carriage 118 is quite rapidly retracted, allowing the work piece to move out of contact with the grinding wheel 64, and after it has moved clear of this wheel, the combined stop and ejector 209 is given a rapid stroke to eject the finished piece. Before this occurs, however, the carrier 228 will have moved upward to receive a new piece, and thus gives a clear path for the ejecting movement of the finished roll.

In machines intended to do ordinary cylindrical grinding, or even in machines intended to operate on truly formed conical blanks, the wide amplitude axial movement of the grinding wheel 64 is not necessary, and in such cases I contemplate that the carriage 60 be dispensed with and a fixed housing be substituted therefor. Since this involves merely the elimination of its guideway and of the reciprocating mechanism which drives the carriage, it is deemed unnecessary to illustrate such a modification.

In machines not intended to do taper work, it is unnecessary to provide for truing the regulating wheel to a tapered form, and in such machines the truing fixture for the regulating wheel may be simplified by omitting the taper-setting adjustment. In such case it therefore is possible to eliminate the pivotal mounting at the point 255, the adjusting screw 257, and clamping means 258, 259. Thus the taper-adjusting base 252 and the skew-adjusting base 256 become a single unitary part. As this omission of certain structural features which have already been above described may be readily understood in view of the foregoing without illustration, I deem it unnecessary specifically to illustrate this possible modification.

With the simpler forms of work piece, such as cylindrical rolls, it is feasible to use the feeding mechanism shown in Fig. 18, and since the operation of this feeding mechanism has been described in connection with that figure, I consider it unnecessary to discuss it further in detail.

The grinding machine may be utilized to do what is now known as through-feed grinding. For such work, the feed and discharge mechanisms would be dismounted, the automatic drive for the regulating wheel carriage would be disconnected, and the regulating wheel carriage (both members 118 and 115) would be locked in a fixed position. The ordinary feed and discharge trough, now known in the through-feed art, could be applied to the work support and the machine could be operated in the now known through-feed-manner. As so operated, the machine would involve no new principles, and hence I do not consider it necessary specifically to illustrate the machine so used, but I wish to point out in connection with this description that in case of need the machine which I have above described in detail is susceptible of being so operated.

It will thus be seen that there has been provided in this invention a grinding apparatus in which the various objects hereinabove set forth, as well as many thoroughly practical advantages, are successfully achieved. The apparatus will be seen to be of an important practical nature and well adapted to meet, in a thoroughly practical way, the peculiar difficulties and problems attendant upon the grinding of specially shaped parts, such as tapered rolls, while the construction is of such flexibility that it may be readily adapted to grind simpler forms or shapes, such as plain cylindrical rolls. By way of further example of the flexibility of the construction I have provided, I might note that I am enabled to cyclically move the regulating wheel 125 toward and away from both the work support 208 and the grinding wheel 64 as by causing periodical sliding movement, under the control of the cam groove 186, of the slide member or carriage 118 (see Figure 1), or, where I desire to achieve certain other important advantages I may achieve cyclic movement toward or away from the grinding wheel 64 of both the regulating wheel 125 and the work support 208, under the control of the cam groove 186, by causing both sliding members or carriages 118 and 115 to move together. It will, moreover, be seen that the apparatus is well adapted to meet the varying conditions of practical use.

The invention is not restricted to the specific embodiments herein illustrated, and I therefore do not limit myself to such specific embodiments except to the extent specified in the accompanying claims.

What is claimed is:

1. In a centerless grinder the combination of a grinding wheel and a regulating wheel movable relatively one toward and from the other; a work support; and automatic means constructed and arranged to cause the wheels to approach each other with progressive deceleration and then come to rest for an appreciable period with a definite space interval between them, and then to separate the wheels rapidly.

2. In a centerless grinder the combination of a grinding wheel; a regulating wheel; a work support; work feeding and ejecting mechanism; mechanism for relatively shifting said wheels one toward and from the other to perform successive grinding cycles; a motor connected to drive said grinding wheel; and a second motor connected to drive said regulating wheel and also to actuate said feed and ejection means and said shifting means in recurrent cyclic time relation with each other.

3. In a centerless grinder the combination of a grinding wheel; a regulating wheel; a work support; work feeding and ejecting mechanism; mechanism for relatively shifting said wheels one toward and from the other to perform successive grinding cycles; a motor connected to drive said grinding wheel; a second motor connected to drive said regulating wheel and also to actuate said feed and ejection means and said shifting means in recurrent cyclic time relation with each other; and speed ratio changing means interposed in the drive from the second motor constructed and arranged to permit adjustment of the speed of the regulating wheel relatively to the rate of cyclic action of the feed, ejection and shifting mechanisms.

4. The combination with a centerless grinder including a grinding wheel, a regulating wheel and a work support, of work blank feeding means serving to feed a work blank into position between the wheels; a finished-work ejecting means; an actuating member removably mounted in the machine to permit removal and interchange with other different but functionally similar actuating members, said member being constructed and arranged to actuate said feeding means and said ejecting means, in a time relation determined by the design of said member; and means for driving said actuating member.

5. The combination with a centerless grinder including a grinding wheel, a regulating wheel, and a work support between said wheels, of means for producing a relative movement of said wheels and support, whereby a work piece sustained by said work support between said wheels will be progressively reduced simultaneously throughout its length by said grinding wheel; a feed device constructed and arranged to feed a work blank to said support; a work ejector constructed and arranged to eject a finished work piece from said support; and actuating means serving to actuate said feed device, then cause said relative movement and then actuate said ejector.

6. The combination with a centerless grinder including a grinding wheel, a regulating wheel, and a work support between said wheels, of means for producing a relative movement of said wheels and support, whereby a work piece sustained by said work support between said wheels will be progressively reduced simultaneously throughout its length by said grinding wheel; a feed device constructed and arranged to feed a work blank to said support; a work ejector constructed and arranged to eject a finished work piece from said support; an interchangeable multiple cam serving to actuate said feed device, then cause said relative movement, and then actuate said ejector; and means for driving said cam.

7. The combination with a centerless grinder of the type in which the grinding and regulating wheels may be moved relatively one toward the other during the grinding operation and then retracted, of work blank feeding means serving to feed a work blank into position between the wheels; a finished work ejection means; a single actuating member constructed and arranged to cause said relative motion of the wheels and to actuate said feeding means and ejection means in time relation; and means for driving said actuating member.

8. The combination with a centerless grinder of the type in which grinding and regulating wheels are moved relatively one toward the other during the grinding operation and then retracted, of work blank feeding means serving to feed a work blank into position between the wheels; a finished work ejection means; an actuating member removably mounted in the machine to permit removal and interchange with other different but functionally similar actuating members, said member being constructed and arranged to cause said relative motion of the wheels and to actuate said feeding means and ejection means in a time relation determined by the design of said member; and means for driving said actuating member.

9. In a centerless grinder, the combination of a grinding wheel; means for driving said wheel; a work support; work blank feeding means operable to feed a work blank to said support; ejecting means operable to eject a finished piece from said support; and a regulating wheel unit comprising a carriage having mounted thereon a regulating wheel, a motor, and driving connections between said motor and said regulating wheel and between said motor and said feeding and ejecting means.

10. In a centerless grinder, the combination of a grinding wheel; means for driving said wheel; a work support; work blank feeding means operable to feed a work blank to said support; ejecting means operable to eject a finished piece from said support; and a regulating wheel unit comprising a carriage having mounted thereon a regulating wheel, carriage-shifting means, a single actuating member for actuating said feeding and ejecting means and said carriage-shifting means, in time relation, a motor, and driving connections from said motor to said regulating wheel and to said actuating member.

11. In a centerless grinder, the combination of a grinding wheel; means for driving said wheel; a work support; work blank feeding means operable to feed a work blank to said support; ejecting means operable to eject a finished piece from said support; and a regulating wheel unit comprising a carriage having mounted thereon a regulating wheel, carriage-shifting means, a single actuating member for actuating said feeding and ejecting means and said carriage-shifting means, in time relation, a motor, variable speed driving connections from said motor to said regulating wheel and independently variable driving connections from said motor to said actuating member.

12. In a centerless grinder the combination of a base; a grinding wheel, mounted thereon; a work support mounted on said base; a mechanism for feeding work blanks to said work support; an ejecting mechanism for removing finished work from said work support, a carriage supported by said base and movable thereon in a direction transverse to the axis of the grinding wheel; a regulating wheel mounted to rotate in said carriage with its periphery opposed to the periphery of said grinding wheel; a motor mounted on said carriage; a variable speed drive train between said motor and said regulating wheel; and mechanism mounted on said carriage and actuated by said motor and serving to move said carriage toward and from the grinding wheel, and to actuate said blank-feeding and work-ejecting mechanisms in time relation.

13. In a centerless grinder the combination of a base; a grinding wheel mounted thereon; a regulating wheel; a carriage in which said regulating wheel is mounted; a support upon which said carriage is mounted, said support being movably mounted upon said base; a work support carried by said support; means for shifting said carriage; and a pair of clamps, one of which serves to lock said support to said base, and the other of which serves to lock said support to said carriage.

14. In a centerless grinder the combination of a base; a grinding wheel mounted thereon; a member slidable on said base toward and from said grinding wheel; a work support mounted on said member; a carriage slidable on said member toward and from said grinding wheel; a regulating wheel mounted on said carriage; and a single traversing means operable alternatively at the will of the operator to shift said member and carriage together relatively to said base, or to shift said carriage relatively to said member and base.

15. In a centerless grinder the combination of a base; a grinding wheel mounted thereon; a member slidable on said base toward and from said grinding wheel; a working support mounted on said member; a carriage slidable on said member toward and from said grinding wheel; a regulating wheel mounted on said carriage; means for locking said member against movement on said base; means for locking said carriage against movement on said member; and traversing means acting between said base and carriage.

16. In a centerless grinder the combination of a base; a grinding wheel mounted thereon; a member slidable on said base toward and from said grinding wheel; a work support mounted on said member; a carriage slidable on said member toward and from said grinding wheel; means for locking said carriage to said member; means for locking said member to said base; a regulating wheel and a motor connected to drive the same, both mounted on said carriage; and mechanism for shifting said carriage relatively to said base arranged to be actuated by said motor.

17. In a centerless grinder the combination of a base; a grinding wheel mounted thereon; a member slidable on said base toward and from said grinding wheel; a work support mounted on said member; a carriage slidable on said member toward and from said grinding wheel; means for locking said carriage to said member; means for locking said member to said base; a regulating wheel and a motor connected to drive the same, both mounted on said carriage; and mechanism for shifting said carriage relatively to said base comprising a manually rotatable screw swiveled on the base, means for locking said screw against rotation, a nut engaging said screw and swiveled on said carriage, and means actuated by said motor and arranged to rotate said nut.

18. In a centerless grinder the combination of a base; a grinding wheel mounted thereon; a member slidable on said base toward and from said grinding wheel; a work support mounted on said member; a carriage slidable on said member toward and from said grinding wheel; means for locking said carriage to said member; means for locking said member to said base; a regulating wheel and a motor connected to drive the same, both mounted on said carriage; and mechanism for shifting said carriage comprising a coacting screw and nut one swiveled in the base and manually operable, the other swiveled in the carriage, connections for driving by said motor the member swiveled in the carriage and means operable to lock the other member against rotation.

19. In a centerless grinder the combination of a grinding wheel; means for driving said wheel; a work support; and a regulating wheel unit comprising a slidable carriage, a regulating wheel, a driving motor therefor, both mounted on said carriage, and mechanism operated by said motor for shifting said carriage.

20. In a centerless grinder the combination of a grinding wheel; means for driving said wheel; a work support; and a regulating wheel unit comprising a slidable carriage, with a regulating wheel, driving motor therefor, variable speed transmission between said motor and wheel, all mounted on said carriage, mechanism for shifting said carriage and means for actuating said mechanism from said motor.

21. In a centerless grinder, the combination of a grinding wheel; means for driving said wheel; a work support; and a regulating wheel unit comprising a carriage, with a regulating wheel, driving motor therefor, variable speed transmission between said motor and wheel all mounted on said carriage, and means for supporting said carriage with said wheel skewed relatively to said grinding wheel.

22. In a centerless grinder the combination of a grinding wheel; means for driving said wheel; a work support; a regulating wheel unit comprising a carriage, a regulating wheel, and a driving motor therefor, both mounted on said carriage; and a removable inclined support for said carriage.

23. In a centerless grinder the combination of a grinding wheel; means for driving said wheel; a work support; a regulating wheel unit comprising a carriage, a regulating wheel, and a driving motor therefor, both mounted on said carriage; and means for guiding said carriage toward and from said grinding wheel and for imparting a definite angle of skew to the regulating wheel relatively to the grinding wheel.

24. In a centerless grinder the combination of a base, a grinding wheel, a carriage in which said grinding wheel is mounted to rotate, said carriage being mounted on said base and being shiftable thereon in the direction of the axis of said grinding wheel; means for driving said wheel while said carriage moves on said base; a mechanism for shifting said carriage back and forth; a second carriage mounted on said base and guided thereon in a direction transverse to the motion of the first carriage; a regulating wheel mounted in said second carriage in opposed relation to said grinding wheel, the movements of said second carriage serving to shift said regulating wheel toward and from said grinding wheel; a motor mounted on said second carriage; and driving connections between said motor and said control wheel.

25. In a centerless grinder the combination of a base; a grinding wheel mounted thereon; a control wheel opposed to said grinding wheel; and means for fixing the angle of skew of said control wheel comprising a laterally inclined member upon which said control wheel is removably mounted and which is itself removably mounted on said base.

26. In a centerless grinder the combination of a grinding wheel and a regulating wheel both mounted in bearings; a main base supporting the bearings of one wheel; and an interchangeable intermediate base interposed between said base and the bearings of the other wheel and serving to fix the angular relation of said wheels.

27. In a centerless grinder the combination of a grinding wheel and a regulating wheel both mounted in bearings; a main base supporting the bearings of one wheel; an interchangeable intermediate base interposed between said base and the bearings of the other wheel and serving to fix the angular relation of said wheels; and a work support mounted on said intermediate base and removable therewith.

28. In a centerless grinder the combination of a grinding wheel and a regulating wheel both mounted in bearings; a main base supporting the bearings of one wheel; an interchangeable intermediate base interposed between said base and the bearings of the other wheel and serving to fix the angular relation of said wheels, said intermediate base being adjustable toward and from the first wheel and the bearings of the other wheel being adjustable on said intermediate base toward and from said first wheel.

29. The combination with a centerless grinding machine having a work support, of a blank-feeding mechanism comprising a magazine tube; a carrier movable between two positions, in one of which it receives a blank from said tube and in the other of which it presents said blank adjacent said work support; and fluid pressure means controlled by the movements of said carrier and operative when the latter is positioned adjacent said work support to discharge a work blank therefrom onto said support.

30. The combination with a centerless grinding machine having a work support, of a blank-feeding member movable to and from a position adjacent said support in which it serves to feed a work blank to said support; an ejector operable to remove a finished work piece from said support along a path approximately coincident with the path of entrance of the work blank from said feeding member; and automatic means arranged to move said member away from said support and to actuate said ejector.

31. The combination with a centerless grinder including a grinding wheel, a regulating wheel and a work support, of a work feeding member constructed and arranged to be moved into and out of proximity to said support and to deposit a work blank thereon when adjacent thereto; a combined stop and ejector adapted to arrest the entering piece and retain it in grinding position; and automatic means arranged first to move said member out of proximity to said support, and then to shift said stop and ejector to force the finished work piece out on the side at which it entered.

32. In a centerless grinder the combination of a grinding wheel; a regulating wheel; a work support; work feeding and ejecting mechanism; mechanism for relatively shifting said wheels, one toward and from the other, to perform successive grinding cycles; means for driving said wheels, said feeding and ejecting mechanism, and said shifting mechanism in recurrent cyclic time relation with each other; and means for individually varying the speed of said wheels and for individually varying the time rate of operation of said feeding and ejecting mechanism and said shifting mechanism relatively to the speeds of said wheels and relatively to each other.

33. In apparatus of the character described, in combination, a grinding wheel adapted to be rotated at relatively high speed, a regulating wheel adapted to be rotated at relatively low speed and in a direction to present an operative surface traveling in a direction relative to that of the grinding wheel to control the rotation of the work, means for guiding work of round section into and out of operative relation to said two wheels, and means for delivering a work piece to said guiding means from a point displaced from said guiding means to permit movement of the work piece into operative relation to said two wheels and for thereafter giving the work piece a retrograde movement along said guiding means.

34. In apparatus of the character described, in combination, a grinding wheel adapted to be rotated at a relatively high speed, a regulating wheel adapted to be rotated at a relatively low speed, said wheels being rotated in directions to present adjacent operative surfaces traveling in opposite directions, a work support extending between said two wheels and having a work supporting surface inclined toward the regulating wheel, stop means for limiting movement of a work piece in an axial direction along said work support, and means for positioning a work piece on said inclined surface of said work support and in operative relation to said regulating wheel, said regulating wheel and said work support being related to each other so that said regulating wheel exerts a feeding thrust to move the work axially into operative relation to the grinding wheel and against said stop means.

35. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support having a work supporting surface inclined toward the regulating wheel, a magazine for holding a supply of work pieces, means for introducing an individual work piece from said magazine into operative relation to said work support and said regulating wheel, said regulating wheel and work support being related to each other so that the regulating wheel feeds the work axially along said work support, whereby said regulating wheel feeds the work piece into operative relation to said grinding wheel, and means for moving a ground work piece out of operative relation to said two wheels.

36. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support having a work supporting surface inclined toward the regulating wheel, means mounting one of said wheels for movement toward or away from the other, said inclined surface of said work support causing a work piece to be held against the surface of the regulating wheel when one of said wheels is moved away from the other and said work support and said regulating wheel being relatively inclined so as to cause the regulating wheel to effect axial movement of a work piece, ejecting means positioned in the line of axial movement of said work piece for limiting the movement thereof, and actuating means serving to cause movement of one wheel away from the other, thereby to permit positioning of the work piece on said support, then move one wheel toward the other, and upon subsequent movement of one wheel away from the other to actuate said ejector means.

37. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support for holding work in operative relation to said two wheels, means for delivering a work piece to said work support for subsequent operation thereon by said two wheels, means for ejecting a work piece, and means having separate connections with and causing said positioning means and said ejecting means to operate in predetermined timed relation.

38. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support for holding work in operative relation to said two wheels, means for withdrawing one wheel from the other in recurring sequence, means for positioning a work piece on said work support, means for ejecting a work piece from said work support, and means having separate connections with and operating said wheel-withdrawing means and said work-positioning means and said work-ejecting means in timed relation.

39. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support having a work supporting surface inclined toward the regulating wheel, one of said wheels being shaped with respect to the other to form a tapered work-receiving and grinding throat, means for positioning a work piece on said inclined surface of said work support and into operative relation to said regulating wheel, said regulating wheel and said work support being relatively inclined to cause the regulating wheel to move the work piece axially in a direction from the larger end of said tapered grinding throat toward the narrower end, a stop for limiting the movement of the work piece along said work support, and means for moving one wheel away from the other to release the work from the grip of the wheels.

40. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support having a work supporting surface inclined toward the regulating wheel, one of said wheels being shaped with respect to the other to form a tapered work-receiving and grinding throat, means for positioning a work piece on said inclined surface of said work support and into operative relation to said regulating wheel, said regulating wheel and said work support being relatively inclined to cause the regulating wheel to move the work piece axially in a direction from the larger end of said tapered grinding throat toward the narrower end, ejecting means positioned in the path of movement of the work piece along said work support and adapted to limit the movement of the work piece, and means for actuating said work-positioning means and said ejecting means in timed relation.

41. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support having a work-supporting surface inclined toward the regulating wheel, one of said wheels being shaped with respect to the other to form a tapered work-receiving and grinding throat, means for positioning a work piece on said inclined surface of said work support and into operative relation to said regulating wheel, said regulating wheel and said work support being relatively inclined to cause the regulating wheel to move the work piece axially in a direction from the larger end of said tapered grinding throat toward the narrower end, ejecting means positioned in the path of movement of the work piece along said work support and adapted to limit the movement of the work piece, means for moving one wheel toward and away from the other, and means for actuating said work-positioning means and said wheel-moving means and said ejecting means in timed relation.

42. In apparatus of the character described, in combination, a base, a grinding wheel rotated at a relatively high speed, a regulating wheel rotated at a relatively low speed and in a direction to present an operative surface traveling in a direction relative to that of the operative surface of said grinding wheel to control the rotation of round work, a work support for holding work in operative relation to said two wheels, a member slidable on said base toward and from said grinding wheel, said work support being mounted upon said member, a member by which said regulating wheel is rotatably supported, said last-mentioned member being slidable on said first-mentioned member toward and from said grinding wheel, mechanism adapted in recurring sequence to shift said second-mentioned member and the regulating wheel carried thereby toward and away from said grinding wheel, and means operable at will for locking said two members together, thereby to cause movement of said work support with said regulating wheel, or to lock said second-mentioned member to said base, thereby to cause movement of said regulating wheel to be also relative to said work support.

43. In apparatus of the character described, in combination, a base, a grinding wheel rotated at a relatively high speed, a regulating wheel rotated at a relatively low speed and in a direction to present an operative surface traveling in a direction relative to that of the operative surface of said grinding wheel to control the rotation of round work, a work support for holding work in operative relation to said two wheels, a member slidable on said base, a second member slidable on said base, one of said members being slidable in a direction transversely to the axis of a work piece, means rotatably mounting said grinding wheel upon one of said members, means rotatably mounting said regulating wheel upon the other of said members, means mounting said work support upon one of said members, and means adapted in recurring sequence to shift one of said members.

44. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support having a work-supporting surface inclined toward the regulating wheel, a slidable member supporting said work support and said regulating wheel for movement in a direction toward and away from said grinding wheel, mechanism adapted in recurring cycles to move said member toward and away from said grinding wheel, said inclined surface of said work support causing the work thereon to be maintained in contact with the operative surface of said regulating wheel when the grinding wheel and the work are out of operative contact.

45. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support having a work-supporting surface inclined toward the regulating wheel, a slidable member supporting said work support and said regulating wheel for movement in a direction toward and away from said grinding wheel, mechanism adapted in recurring cycles to move said member toward and away from said grinding wheel, said inclined surface of said work support causing the work thereon to be maintained in contact with the operative surface of said regulating wheel when the grinding wheel and the work are out of operative contact, said work support and said regulating wheel being related to each other so that the regulating wheel urges the work in an axial direction along said work support, means for reciprocating said grinding wheel in a direction lengthwise of the work, and means forming a stop for limiting axial movement of the work.

46. In apparatus of the character described, in combination, a grinding wheel rotated at a relatively high speed, a regulating wheel rotated at a relatively low speed and in a direction to present an operative surface traveling in a direction relative to that of the operative surface of said grinding wheel to control the rotation of round work, a work support having a work-supporting surface inclined toward the regulating wheel, a slidable member supporting said work support and said regulating wheel for movement in a direction toward and away from said grinding wheel, mechanism adapted in recurring cycles to move said member toward and away from said grinding wheel, said inclined surface of said work support causing the work thereon to be maintained in contact with the operative surface of said regulating wheel when the grinding wheel and the work are out of operative contact, said work support and said regulating wheel being related to each other so that the regulating wheel urges the work in an axial direction along said work support, ejecting means positioned in the path of axial movement of the work, and means operating in timed relation to the movement of said regulating wheel and work support for actuating said ejecting means.

47. In grinding apparatus, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed and in a direction to present an operative surface traveling in a direction relative to that of the operative grinding wheel surface to control the rotation of the work, and the third of which means includes a member for holding work of round section in operative relation to said two wheels, and fluid pressure means for effecting movement of a work piece relative to said grinding throat.

48. In apparatus of the character described, in combination, a grinding wheel rotated at a relatively high speed, a regulating wheel rotated at a relatively low speed to control the rotation of the work, the portion of the work surface contacted by the regulating wheel moving in the same direction as the operative surface of the regulating wheel and the grinding wheel being rotated so that its operative surface moves past, and in the same direction as, the portion of the work surface being ground by said grinding wheel, a work support for holding work in operative relation to said two wheels and with which a peripheral portion of the work engages, means mounting said regulating wheel and work support on the one hand and said grinding wheel on the other hand to permit relative movement therebetween in directions to permit operative engagement and disengagement between said grinding wheel and the work, mechanism adapted upon operation to effect said relative movement, and means for operating said mechanism to cause said relative movement to take place in a direction to effect gripping of the work by the wheels for rotation by said regulating wheel and grinding by said grinding wheel and then to cause said relative movement to take place in a direction to effect disengagement between said grinding wheel and the work, said work support and said regulating wheel being related to said grinding wheel so as to maintain operative contact between the work and said regulating wheel when said grinding wheel and the work are out of engagement.

49. In grinding apparatus, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed and in a direction to present an operative surface traveling in a direction relative to that of the operative grinding wheel surface to control the rotation of the work, and the third of which means includes a member for holding work of round section in operative relation to said two wheels; mechanism for cyclically changing the relation of the grinding throat to the work and for effecting a movement of a work piece relative to the grinding throat, and interchangeable means for varying the periodicity of operation of said mechanism.

50. A centerless grinding machine comprising a work regulating wheel and a grinding wheel, means for rotating the regulating wheel slowly and the grinding wheel rapidly respectively to rotate and grind the work positioned therebetween, means for supporting work of round section between said wheels, a positively operated precision mechanism for moving one of the wheels cyclically towards the other wheel to grind the work to a predetermined size and thereafter withdraw the wheel, a separate mechanism constructed and arranged to move work pieces separately and successively into operative relation to said work supporting means and to said regulating wheel to a position for grinding, and means for operating the work moving mechanism in a uniformly periodic and properly timed relation relative to the cyclic wheel movement effected by said wheel-moving mechanism so as to position a work piece for grinding while the wheels are separated.

51. A centerless grinding machine comprising a work regulating wheel and a grinding wheel, means between said wheels for supporting work for free rotation, means for rotating the regulating wheel and the grinding wheel at speeds respectively to rotate and grind the work, a mechanism constructed and arranged to move pieces of work successively into operative relation to said work supporting means, power operated means for moving one of the wheels towards and away from the other to effect rotation by the regulating wheel and grinding by the grinding wheel of the work to a given size, means for reciprocating the grinding wheel axially during grinding, and means for operating the work moving mechanism in a uniformly periodic and properly timed relation relative to the wheel movement effected by said wheel-moving means to position work for rotation and grinding by said wheels respectively and to permit discharge thereof.

52. A centerless grinding machine comprising a work regulating wheel and a grinding wheel, means adapted to support work for free rotation between said wheels, means for rotating the regulating wheel and grinding wheel at speeds respectively to rotate and grind the work, a work moving member constructed and arranged to carry work pieces separately into operative relation to said wheels and said work supporting means, and a cam operated mechanism for moving said member cyclically.

53. A grinding machine comprising a work regulating wheel and a grinding wheel, means for rotating the regulating wheel and grinding wheel at speeds respectively to rotate and grind the work, a work supply source, a cyclically operated work moving member constructed and arranged to move work pieces separately from said source to a position substantially between said wheels, fluid pressure means for removing a work piece from said member, and means operative when said member has moved a work piece substantially between said wheels for making effective said fluid pressure means.

54. A grinding machine comprising a work regulating wheel and a grinding wheel, means for rotating the regulating wheel and the grinding wheel at speeds respectively to rotate and grind the work, a cam operated mechanism constructed and arranged to move work relative to the grinding throat formed by said wheels, cam operated means for moving one of the wheels towards and away from the other wheel, and means for reciprocating the grinding wheel axially during grinding, said work-moving mechanism being operated in a uniformly periodic and properly timed relation relative to the wheel movement effected by said wheel-moving means.

55. In grinding apparatus, in combination, a work regulating wheel rotatable at relatively low speed, a grinding wheel rotatable at relatively high speed, said wheels presenting adjacent operative surfaces traveling in opposite directions, said regulating wheel acting to rotate work of round section interposed between said two wheels, means for holding work of round section between said two wheels, a member movable in the general direction toward said work-holding means and adapted to carry a work piece substantially between said wheels, and means for removing said work piece from said member and moving it into operative relation to said work-holding means.

56. In grinding apparatus, in combination, a work regulating wheel rotatable at relatively low speed, a grinding wheel rotatable at relatively high speed, said wheels presenting adjacent operative surfaces traveling in opposite directions, said regulating wheel acting to rotate work of round section interposed between said two wheels, means for holding work of round section between said wheels, a magazine for holding a supply of work pieces, means including a member movable in the general direction toward said work-holding means and adapted to receive work pieces one at a time from said magazine and move them individually between said wheels, and means for removing a work piece from said member and effecting its movement into operative relation to said work-holding means.

57. In grinding apparatus, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed and in a direction to present an operative surface traveling in a direction relative to that of the operative grinding wheel surface to control the rotation of the work, and the third of which means includes a member for holding work of round section in operative relation to said two wheels; power driven means adapted in recurring sequence to change the relation of the grinding throat to the work, thereby to permit insertion or removal of a work piece with respect to the grinding throat; and interchangeable means for varying the periodicity of operation of said power driven means.

58. In grinding apparatus, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed and in a direction relative to that of the operative grinding wheel surface to control the rotation of the work, and the third of which means includes a member for holding work of round section in operative relation to said two wheels; power actuated means operating recurrently for controlling the movement of a work piece with respect to said grinding throat; and interchangeable means for varying the periodicity of operation of said power actuated means.

59. In grinding apparatus, in combination, a grinding throat adapted for simultaneous grinding and rotating action upon work of round section and comprising three means, one of which means is in the form of a grinding wheel adapted to be rotated at a relatively high speed, another of said means being in the form of a regulating wheel adapted to be rotated at a relatively low speed and in a direction to present an operative surface traveling in a direction relative to that of the operative grinding wheel surface to control the rotation of the work, and the third of which means includes a member for holding work of round section in operative relation to said two wheels; a magazine for holding a supply of work pieces; power driven means adapted in recurring sequence to effect movement of a work piece from said magazine into said grinding throat; and interchangeable means for varying the periodicity of operation of said power driven means.

60. In apparatus of the character described, in combination, a frame, a grinding wheel and a regulating wheel mounted on the frame in opposition to each other to provide a work-receiving throat therebetween and to permit movement of one wheel relative to the other to vary the width of the grinding throat, means for feeding work into the grinding throat, means for ejecting work from the grinding throat, means for varying the width of the grinding throat to permit feeding of work thereinto for subsequent operation thereon by said wheels and for ejecting of the work from the throat, and a single cam member having portions for actuating the throat-varying means, the work-feeding means, and the work-ejecting means, in timed relation.

61. In a grinding apparatus, in combination, a grinding throat including a grinding wheel, a regulating wheel member for controlling the rotation of work of round section, and a member for holding work in operative relation to said wheels; a magazine; a movable carrier adapted in one position to receive a work piece from said magazine and in another position to present said work piece adjacent one of said grinding throat members; means operative substantially when said carrier has presented a work piece adjacent one of said grinding throat members to give the work piece a movement in a general direction lengthwise of one of said grinding throat members; an ejector operable to remove a finished work piece from said grinding throat along a path substantially coincident with its path of entrance; and means for actuating said ejector and moving said carrier out of the path of the work piece being ejected.

62. In grinding apparatus, in combination, a grinding throat including a grinding wheel, a regulating wheel member for controlling the rotation of work of round section, and a member for holding work in operative relation to said wheels; a carrier pivotally mounted to swing about an axis such that movement of said carrier about its axis carries a work piece to a position adjacent one of said grinding throat members; means for giving a work piece thus carried by said carrier a movement in a general direction lengthwise of one of said grinding throat members; an ejector operable to remove a finished work piece from said grinding throat along a path substantially coincident with its path of entrance; and mechanism for oscillating said carrier, actuating said work piece-moving means, and actuating said ejector in timed relation.

63. In grinding apparatus, in combination, a grinding throat including a grinding wheel, a regulating wheel member for controlling the rotation of work of round section, and a member for holding work in operative relation to said wheels; a work piece carrier; means mounting said carrier for oscillation about an axis such that a work piece carried thereby is moved to a position adjacent one of said grinding throat members; means for supplying work pieces individually to said carrier; means for oscillating said carrier about its axis; and means operating in timed relation with said last-mentioned means for giving a work piece a movement in a general direction lengthwise of one of said grinding throat members substantially when said carrier has positioned said work piece with respect thereto.

64. In grinding apparatus, in combination, a grinding throat including a grinding wheel, a regulating wheel member for controlling the rotation of work of round section, and a member for holding work in operative relation to said wheels; a work piece carrier; means mounting said carrier for oscillation about an axis such that, upon movement of said carrier, the latter delivers a work piece to one of said grinding throat members from a point displaced therefrom and in a position to permit movement of the work piece into said grinding throat; and means for oscillating said carrier.

In testimony whereof I have signed my name to this specification.

SOL EINSTEIN.